Figure 1:
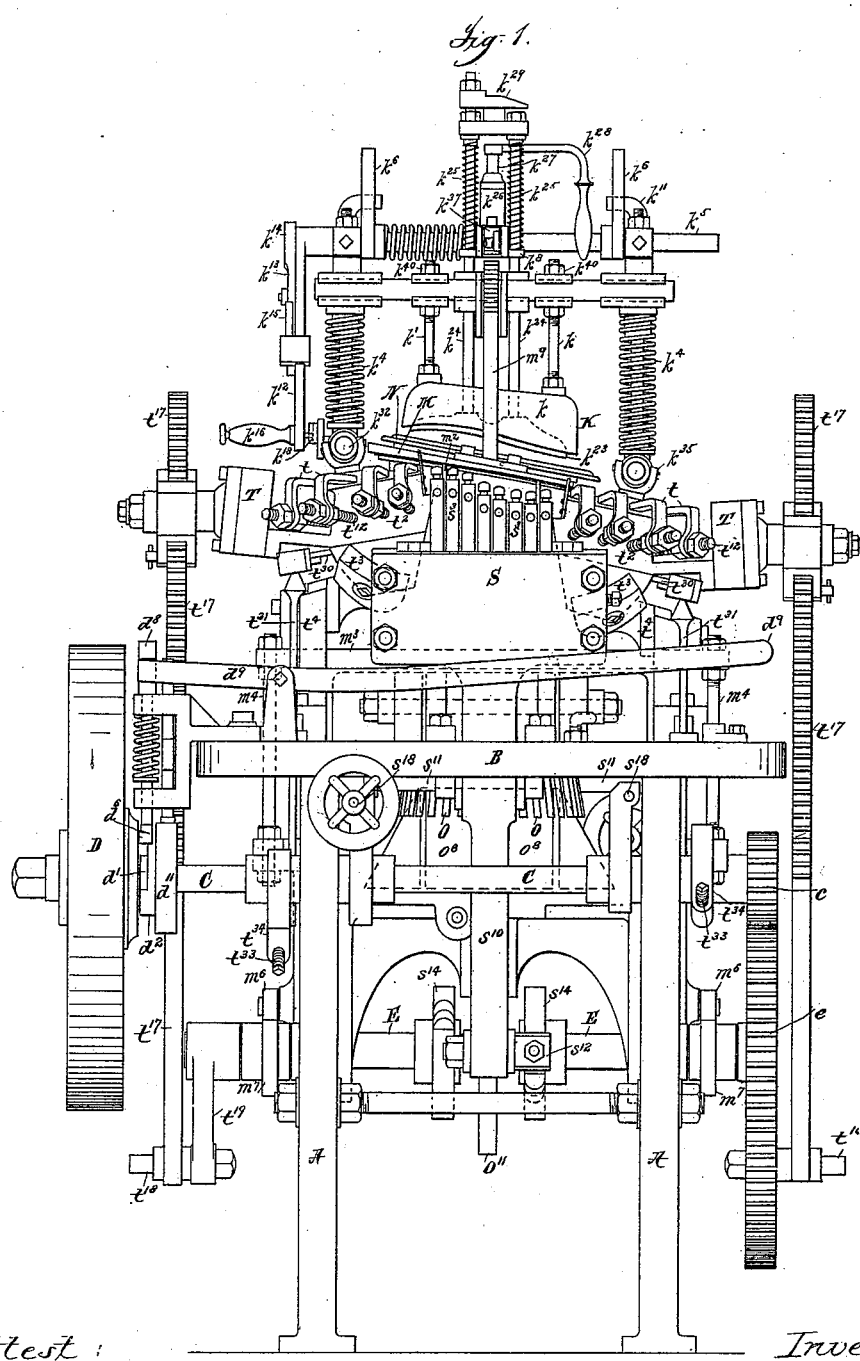

(No Model.) 20 Sheets—Sheet 1.

J. PATTEN.
LASTING MACHINE.

No. 403,067. Patented May 7, 1889.

Attest:
G. H. Botts
D. M. Borst

Inventor
John Patten
By Philipp, Phelps & Hovey
Attys (No Model.) 20 Sheets—Sheet 2.

J. PATTEN.
LASTING MACHINE.

No. 403,067. Patented May 7, 1889.

Attest:
Geo. H. Botts
G. M. Borst

Inventor,
John Patten
By Philip Phelps & Huvy
Attys (No Model.)

20 Sheets—Sheet 3.

J. PATTEN.
LASTING MACHINE.

No. 403,067.

Patented May 7, 1889.

(No Model.) 20 Sheets—Sheet 4.

J. PATTEN.
LASTING MACHINE.

No. 403,067. Patented May 7, 1889.

Attest:
Geo. H. Botts
G. M. Borst

Inventor:
John Patten
By Philipp, Phelps & Hovey
Att'ys (No Model.)  J. PATTEN.  20 Sheets—Sheet 5.
LASTING MACHINE.

No. 403,067.  Patented May 7, 1889.

Attest:
Geo. H. Botts
G. M. Borst

Inventor:
John Patten
By Philipp Phelps & Hovey
Attys.

(No Model.) 20 Sheets—Sheet 6.

J. PATTEN.
LASTING MACHINE.

No. 403,067. Patented May 7, 1889.

Attest:
Geo. H. Botts.
G. M. Borst.

Inventor:
John Patten
By Philip, Philps & Hovey
Attys (No Model.)
20 Sheets—Sheet 7.

J. PATTEN.
LASTING MACHINE.

No. 403,067.  Patented May 7, 1889.

Attest:
Geo. H. Potts.
G. M. Borst

Inventor:
John Patten
By Philipp Philipp Hovey
Attys (No Model.) 20 Sheets—Sheet 8.
J. PATTEN.
LASTING MACHINE.

No. 403,067. Patented May 7, 1889.

Attest:
Geo. H. Botts.
G. M. Borst

Inventor:
John Patten
By Philipp Philipp & Hovey
Attys (No Model.) 20 Sheets—Sheet 9.
J. PATTEN.
LASTING MACHINE.

No. 403,067. Patented May 7, 1889.

(No Model.) 20 Sheets—Sheet 10.
J. PATTEN.
LASTING MACHINE.

No. 403,067. Patented May 7, 1889.

Attest:
Geo. H. Botts.
G. M. Borst.

Inventor:
John Patten
By Philipp Phelps & Hovey
Attys (No Model.) 20 Sheets—Sheet 11.
J. PATTEN.
LASTING MACHINE.
No. 403,067. Patented May 7, 1889.
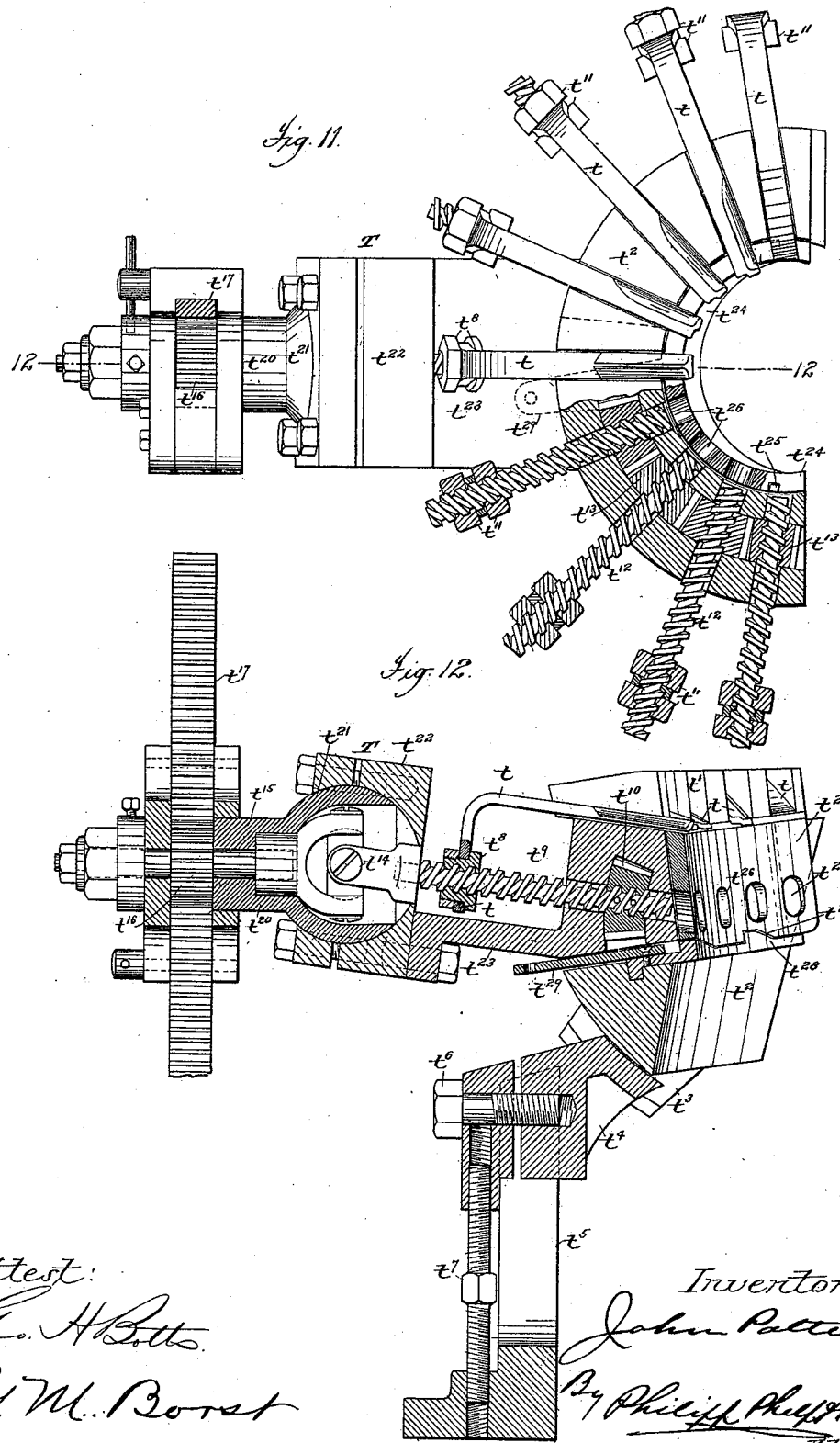

(No Model.) 20 Sheets—Sheet 12.
J. PATTEN.
LASTING MACHINE.
No. 403,067. Patented May 7, 1889.
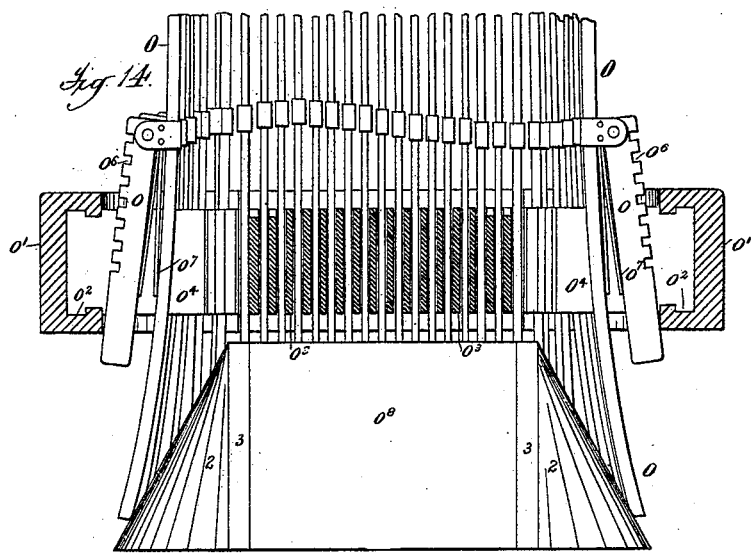
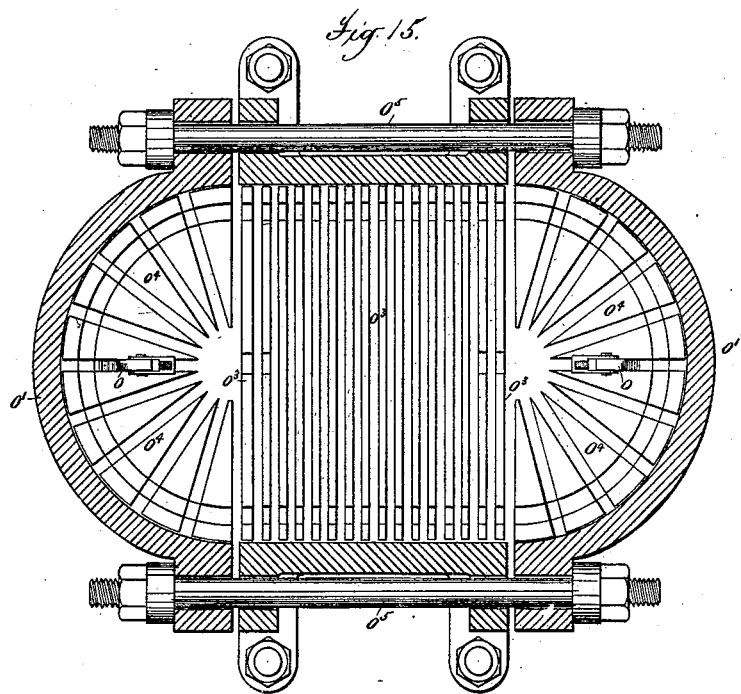
Attest:
Geo. H. Botts
G. M. Borst
Inventor:
John Patten
By Philipp Phelps & Huvy
Attys.

(No Model.) 20 Sheets—Sheet 13.
J. PATTEN.
LASTING MACHINE.
No. 403,067. Patented May 7, 1889.
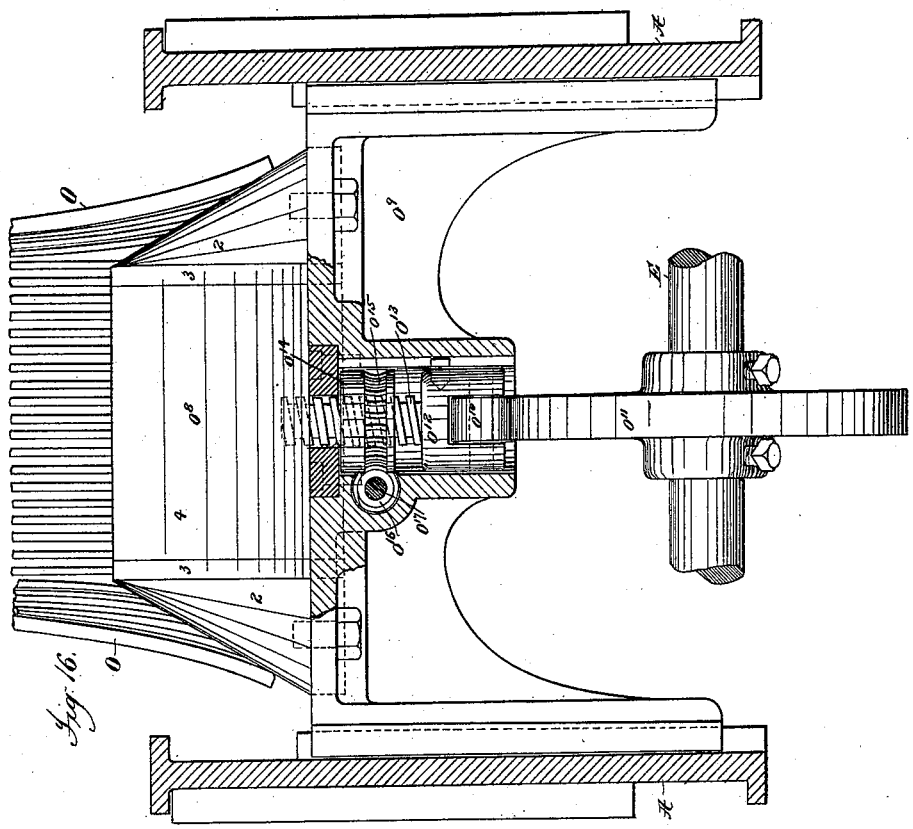
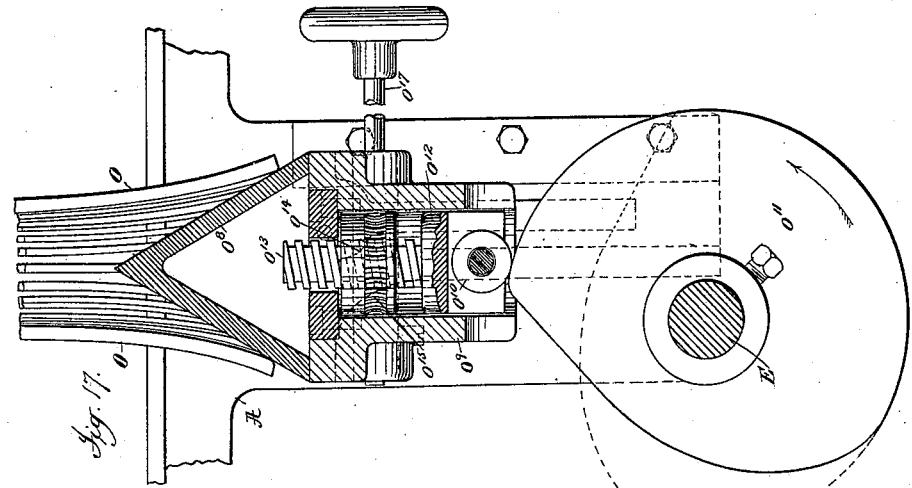

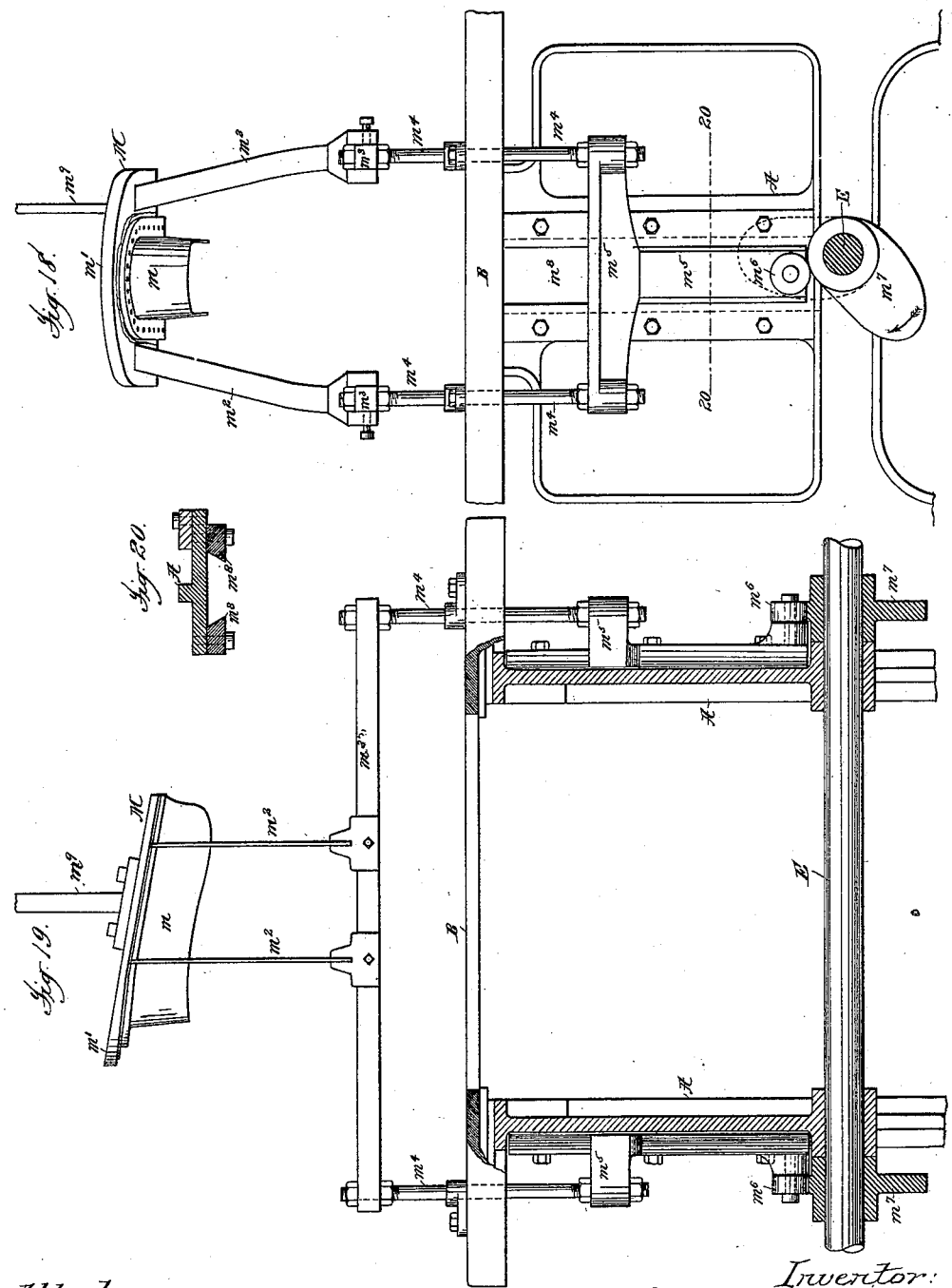

(No Model.) 20 Sheets—Sheet 15.
J. PATTEN.
LASTING MACHINE.
No. 403,067. Patented May 7, 1889.
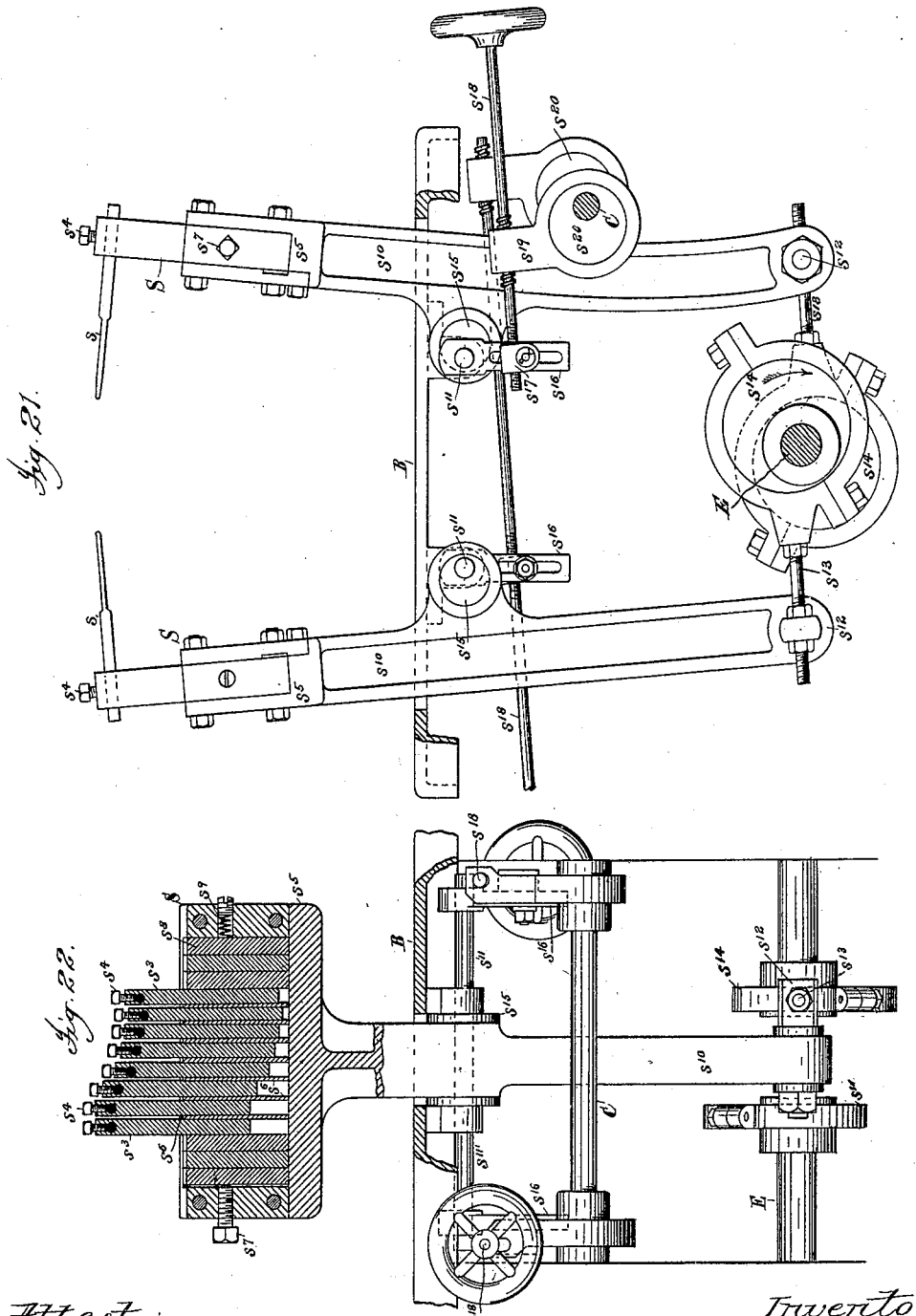

(No Model.) 20 Sheets—Sheet 16.
J. PATTEN.
LASTING MACHINE.
No. 403,067. Patented May 7, 1889.
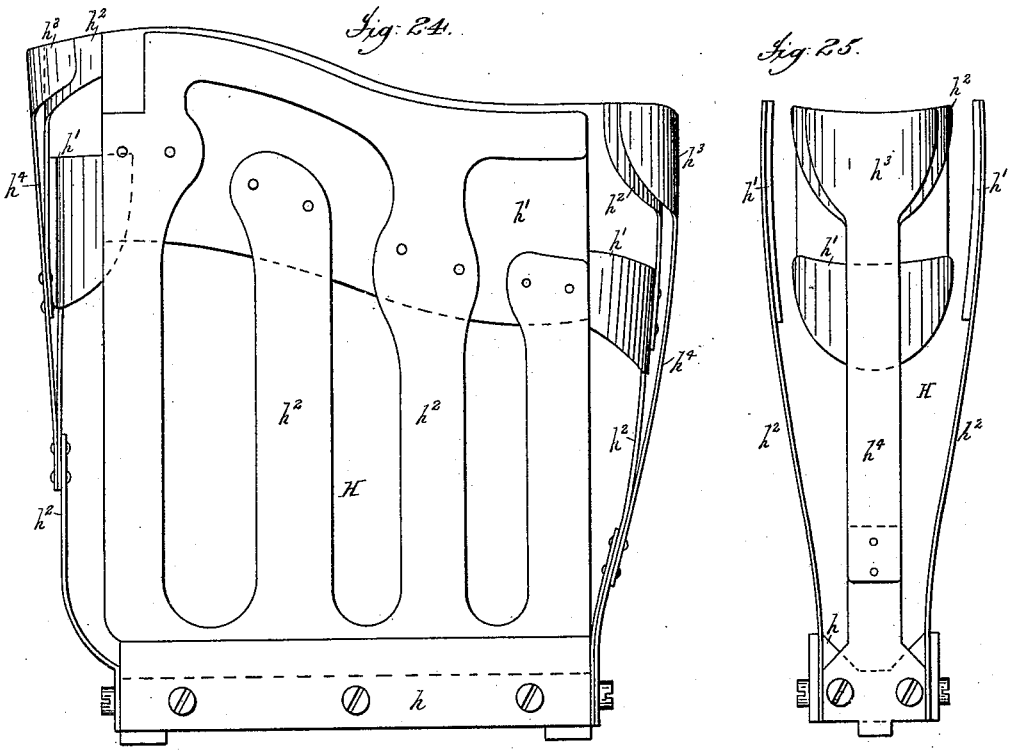
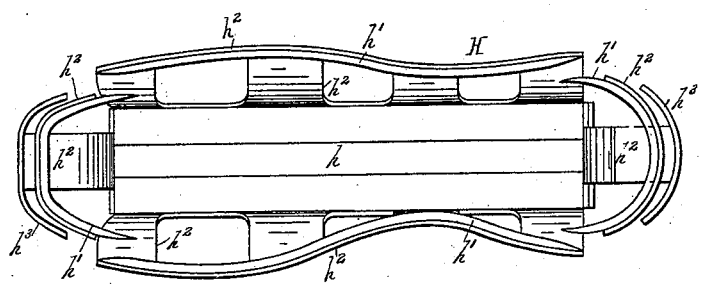

(No Model.) 20 Sheets—Sheet 17.

J. PATTEN.
LASTING MACHINE.

No. 403,067. Patented May 7, 1889.

Attest:
Geo. H. Botts
G. M. Borst

Inventor:
John Patten
By Philipp Philipp & Horn,
Attys (No Model.)
20 Sheets—Sheet 18.
J. PATTEN.
LASTING MACHINE.
No. 403,067. Patented May 7, 1889.
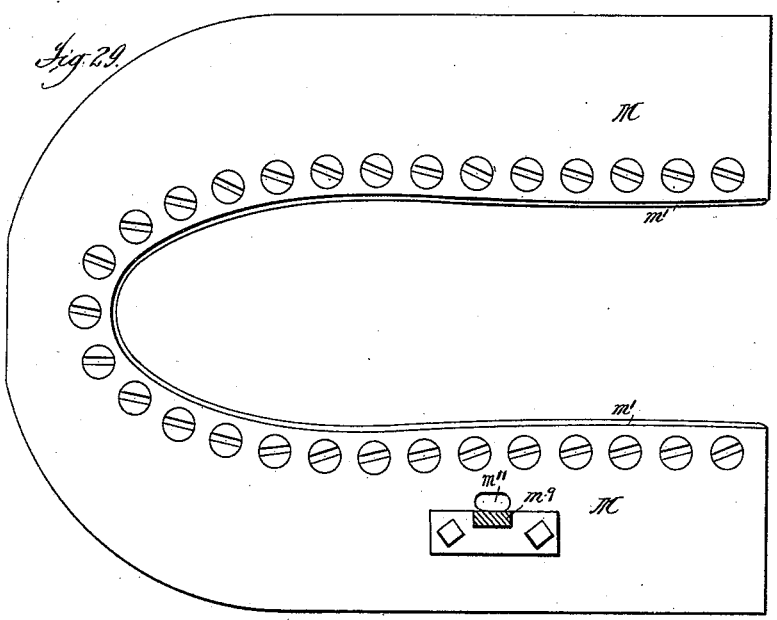
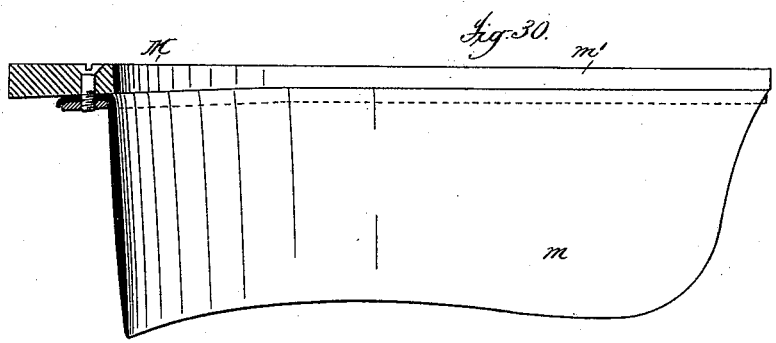
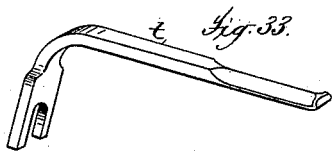
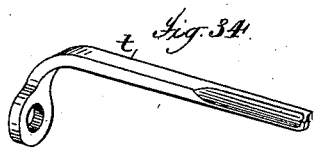
Attest:
Geo. H. Botts.
G. M. Borst.
Inventor:
John Patten
By Philipp, Philipp & Henry
Attys (No Model.) 20 Sheets—Sheet 19.
J. PATTEN.
LASTING MACHINE.
No. 403,067. Patented May 7, 1889.
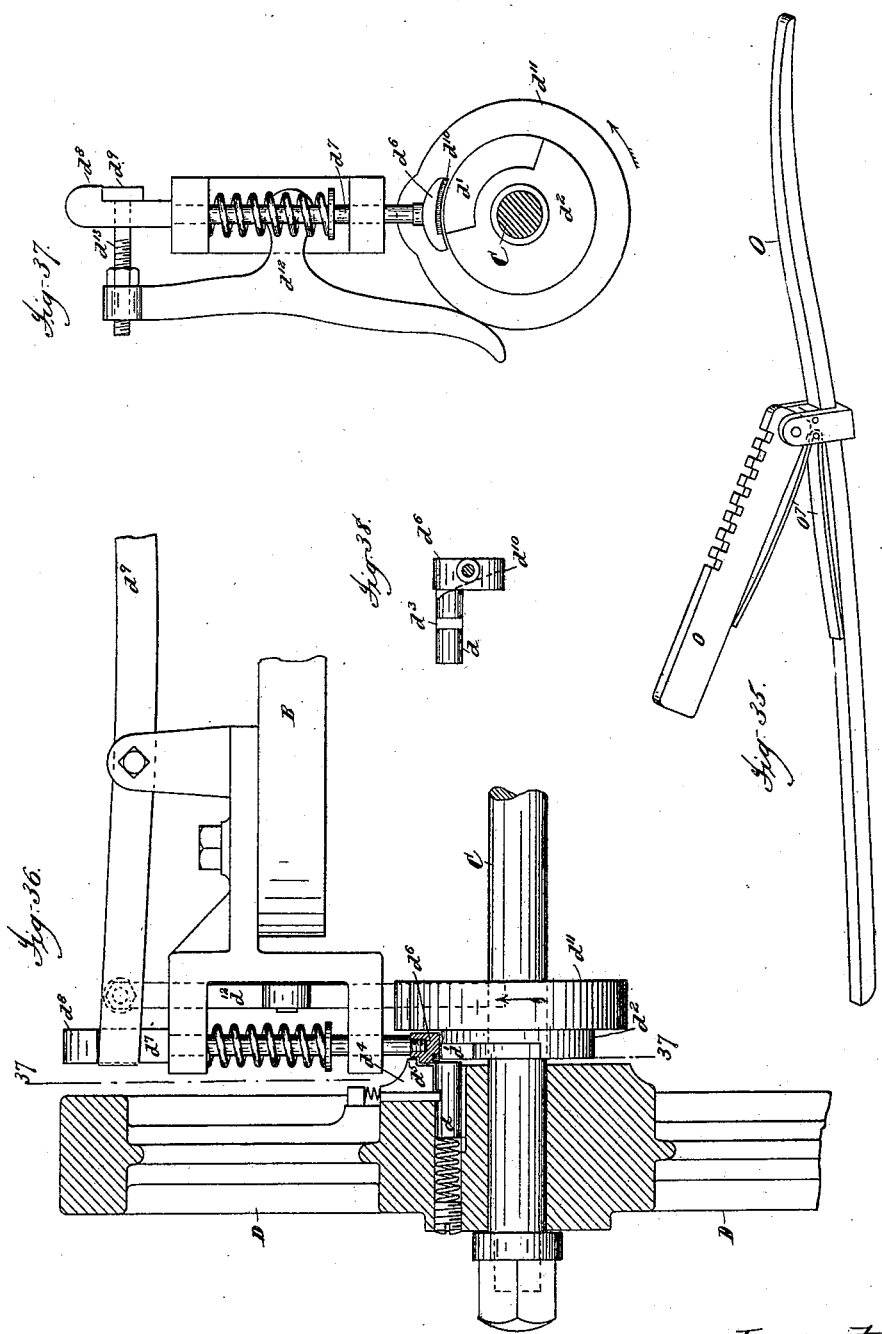

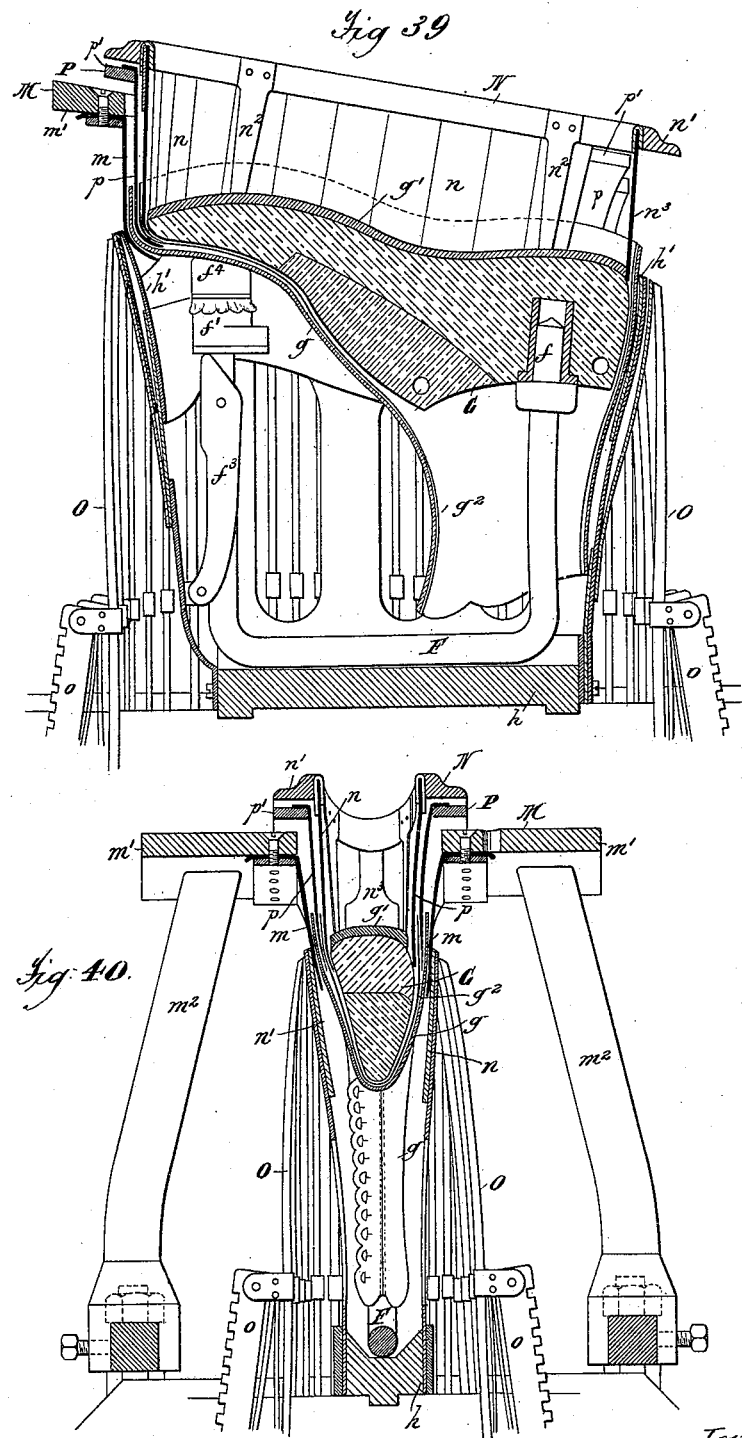

UNITED STATES PATENT OFFICE.

JOHN PATTEN, OF NEW YORK, N. Y.

LASTING-MACHINE.

SPECIFICATION forming part of Letters Patent No. 403,067, dated May 7, 1889.

Application filed November 27, 1888. Serial No. 292,001. (No model.)

*To all whom it may concern:*

Be it known that I, JOHN PATTEN, a citizen of the United States, residing at New York, county of New York, and State of New York, have invented certain new and useful Improvements in Lasting-Machines, fully described and represented in the following specification and the accompanying drawings, forming a part of the same.

This invention relates to an organized machine for lasting boots and shoes—that is to say, a machine which operates to stretch the material which forms the upper of the boot or shoe around the last and cause it to properly conform thereto to give the desired shape to the boot or shoe.

It is the object of the invention to provide a lasting-machine which is simple in its construction, which, as to its principal functions, is automatic in its operation, and which shall be capable of operating upon various grades of material and giving to it the required stretch without danger of rupturing or otherwise injuring it.

One part of the invention consists in an improved mechanism for stretching the upper around the last. Other parts of the invention consist in improvements in the other mechanisms which go to make up the complete machine, and still other parts of the invention consist in the general organization of the machine, all of which will be hereinafter fully described and particularly pointed out and claimed.

To aid in a more easy understanding of the detailed description of the several mechanisms and their operation which will be hereinafter given, a brief general description of the organization and operation of the machine will be first given.

The complete machine may be naturally divided into four mechanisms, which perform functions which are to some extent independent of each other, although all of these mechanisms co-operate to form the complete machine. These mechanisms are the mechanism for supporting and holding the last in position during the lasting operation, the mechanism for stretching and conforming the upper around the last and for holding it in its stretched condition while its edges are being folded over onto the bottom of the last and secured in that position, the mechanism for folding over the edges of the upper at the sides of the last, and the mechanism for folding over the edges of the upper at the heel and toe of the last.

The mechanism for supporting the last and holding it in position consists of an under support and a downhold. The under support consists of a loose removable jack made approximately yoke-shaped, one arm of which enters an opening in the heel of the last, while the other arm is provided with a clamp which is forced against the upper near the toe of the last in such manner as to clamp the upper to the last and prevent it from being displaced during the stretching operation. This loose removable jack carrying the last rests in a suitable bed formed for its reception in the machine. The downhold for the last, which is approximately a counterpart of the bottom of the last, rests upon the upturned bottom of the last and acts to prevent the last from being raised by the upward strain exerted upon it during the stretching operation, and also to hold the insole to the last. This downhold consists of two members, which telescope, and which, for convenience, are termed the "outer downhold" and the "inner downhold." Both members of the downhold remain upon the last until after the stretching is completed, after which the outer downhold, the bearing-edge of which rests upon the outer edge of the insole, so as to hold it in position during the stretching, is raised to allow the folding, while the inner downhold remains depressed to hold the insole in position until after the folding. The two members of the downhold are supported upon rods having means by which the two members can be simultaneously depressed onto the bottom of the last and by which they can be successively raised, as just stated.

The mechanism for stretching the upper around the last and for holding it in its stretched condition during the folding operation consists, primarily, of two instrumentalities, which I term, respectively, a "rubbing stretcher or stretchers" and "lateral pressers." The rubbing-stretchers, of which there are usually two, are composed of more or less flexible material, and are arranged one within the other, extending along the sides and around the toe of the last. The inner rubbing-stretcher is inserted between the last and the upper, and the outer rubbing-stretcher extends around the last outside the upper, so that the edge of the upper lies between the two stretchers. When the upper is provided with a lining or is composed of two plies which stretch unequally, a third or intermediate rubbing-stretcher may be employed, which will be introduced between the upper and lining or between the plies of the upper. Co-operating with the rubbing-stretchers are lateral pressers, which do not partake of the movement of the stretchers, and which therefore may be said to be stationary relatively to the stretchers, which operate to press and hold the stretchers with the interposed upper against the edge of the last with considerable force. In the operation of the machine the pressers are sometimes operated to press the stretchers and the upper against the edge of the last prior to the lowering of the downhold onto the bottom of the last, so that in addition to their function of pressing the stretchers and the upper against the last they also operate to center the last in proper position. When the parts are in this position, the stretching of the upper is effected by moving the stretchers away from the last, so as to withdraw them from between the pressers and the last. The friction between the upper and the stretchers, due to the pressure of the pressers, will cause the stretchers as they are withdrawn to exert a rubbing action against the upper, and thus draw upon it sufficiently to give it the proper stretch to cause it to conform to the last. As soon as the stretchers are withdrawn the pressers spring inward and continue to press the upper against the last, so as to retain it in its stretched condition during the subsequent operations of folding over and securing its edges upon the bottom of the last. For the purpose of preventing the pressers from marring the upper, particularly in the case of fine work, there is provided a shield made of material which is more or less flexible, and is interposed between the pressers and the outer stretcher in such manner that the pressers do not bear directly against the stretcher during the stretching and the upper after the stretchers have been withdrawn, but only act upon the outer stretcher and the upper through the medium of the interposed shield.

The mechanism for folding over the upper at the sides of the last consists of two side-crimpers, one for each side of the last, which are carried upon vibrating heads and are so operated that after the stretchers have been withdrawn they are simultaneously advanced upon the opposite sides of the last to fold over the edge of the upper onto the bottom of the last. Each of the side-crimpers is composed of a number of independently-adjustable crimping-fingers, the positions of which can be varied within wide range to conform to the outlines of different lasts.

The mechanism for folding over the upper at the heel and toe of the last consists of a heel-crimper and a toe-crimper, which are duplicates, and each of which is composed of a number of independently-moving crimping-fingers, which are radially arranged and are advanced simultaneously, so as to converge at the heel and toe of the last and fold over the upper at those points simultaneously with the folding over of the upper at the sides of the last. After the folding is completed the inner downhold is raised and the entire downhold, together with the stretchers, is moved laterally away from its position over the last. The edge of the upper is then secured in position by tacking or otherwise, after which the crimpers and the pressers are retracted. The last, with its jack, is then removed and another jack carrying a last and an upper is inserted and the operation is repeated.

The various mechanisms which have been mentioned, with the exception of the downhold, are automatic in their operations, the operating mechanism being so timed that the several mechanisms will perform their respective operations in proper sequence.

The details in the constructions of the several mechanisms and the organization thus briefly outlined will now be fully described in connection with the accompanying drawings, in which—

Figure 2:
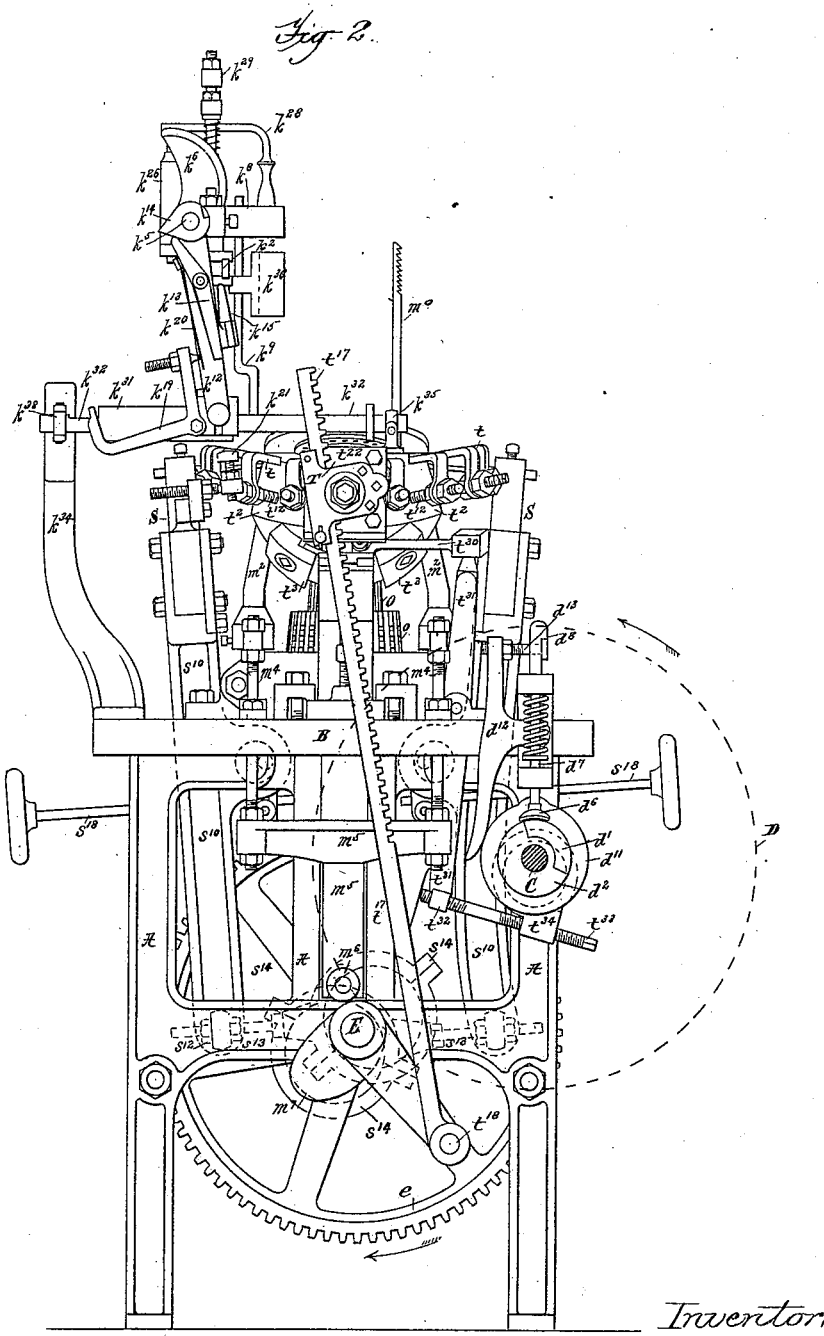
Figure 3:
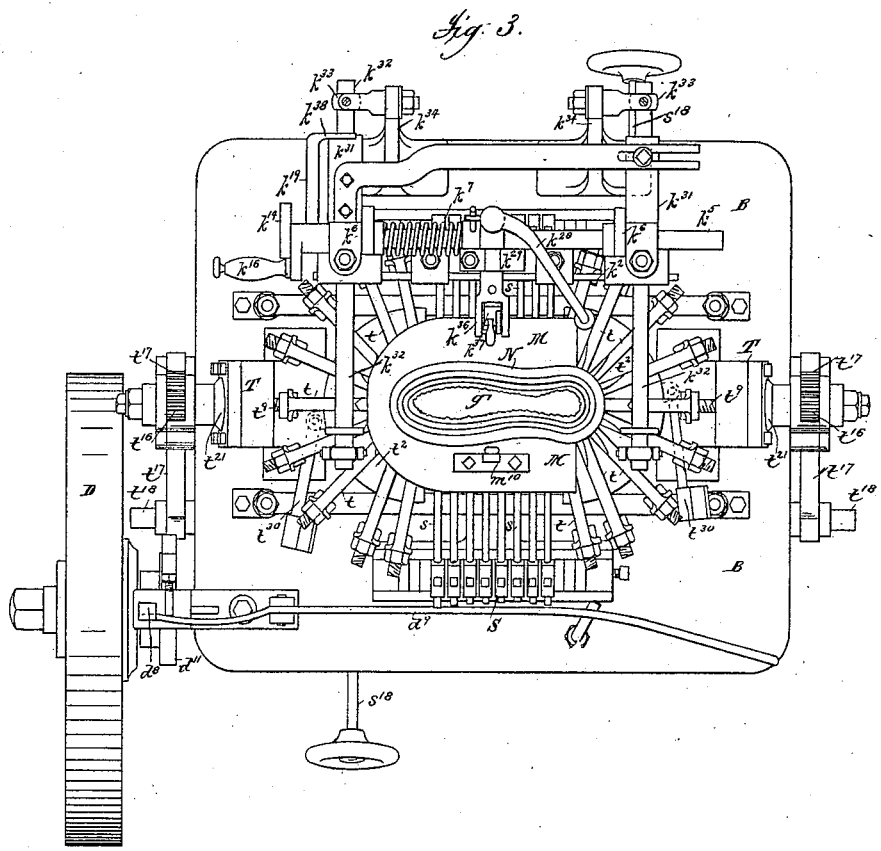
Figure 4:
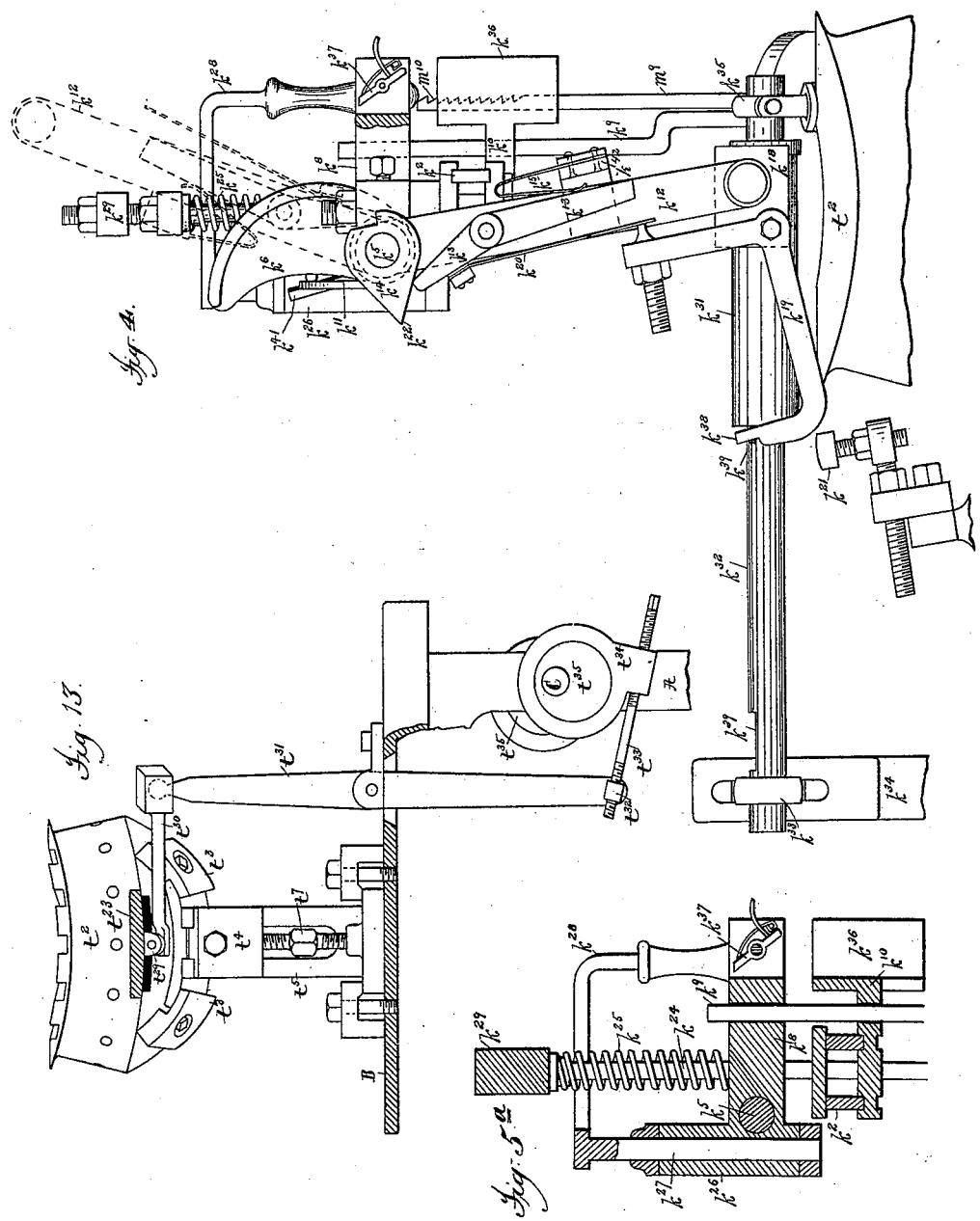
Figure 5:
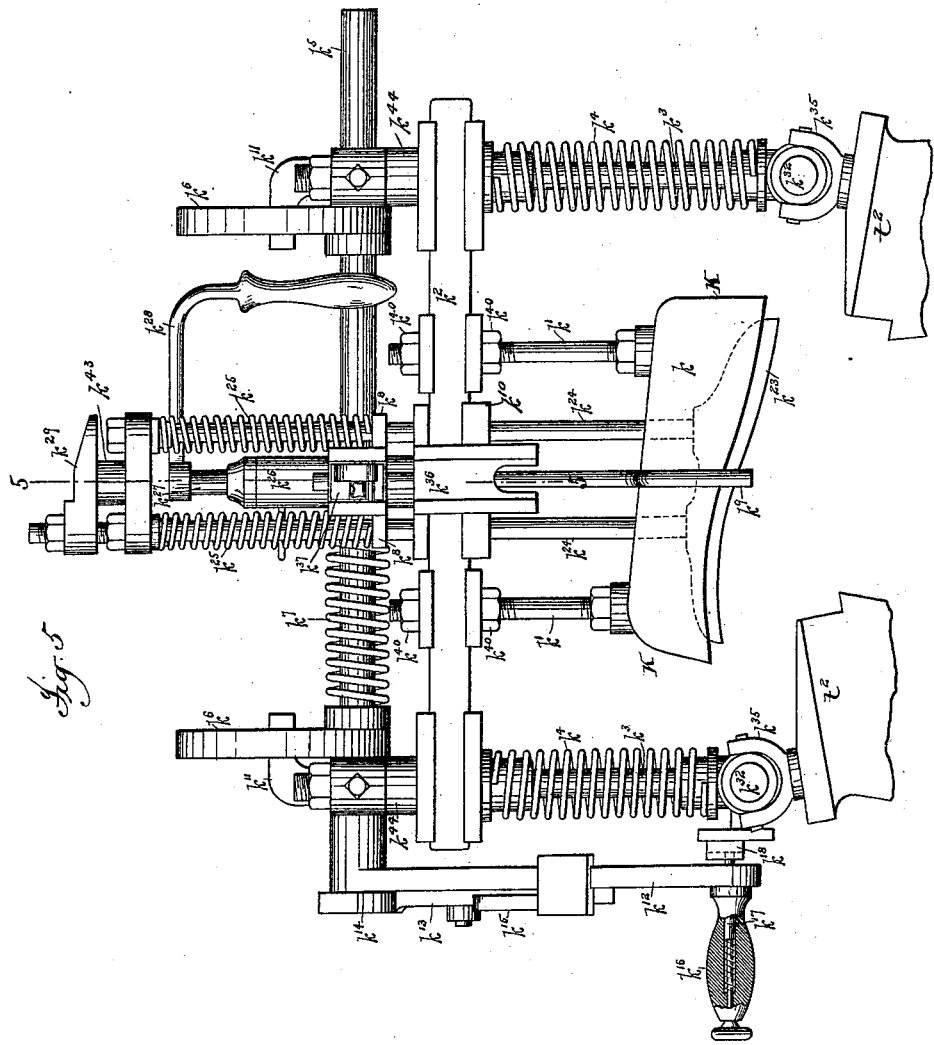
Figure 6:
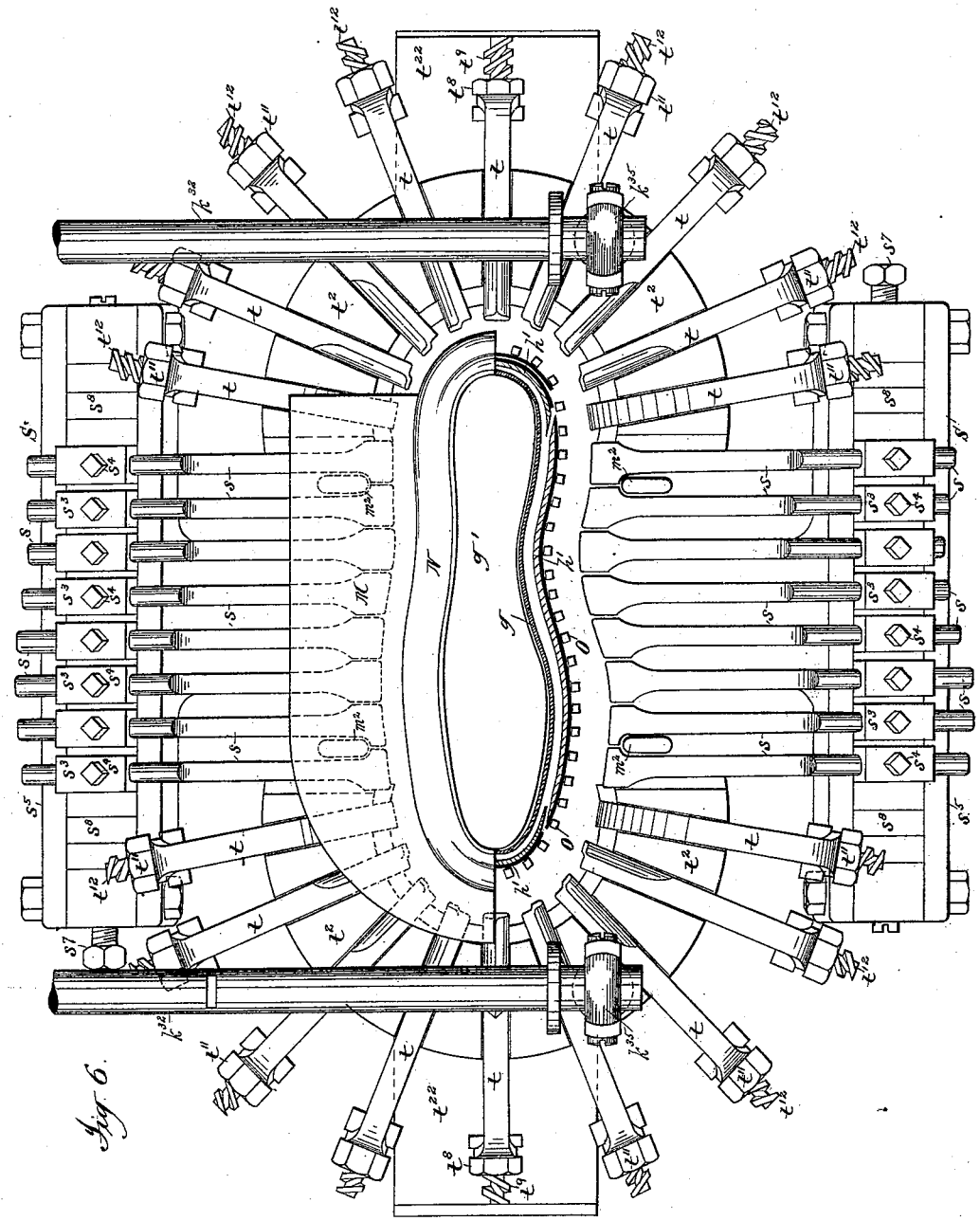
Figure 7:
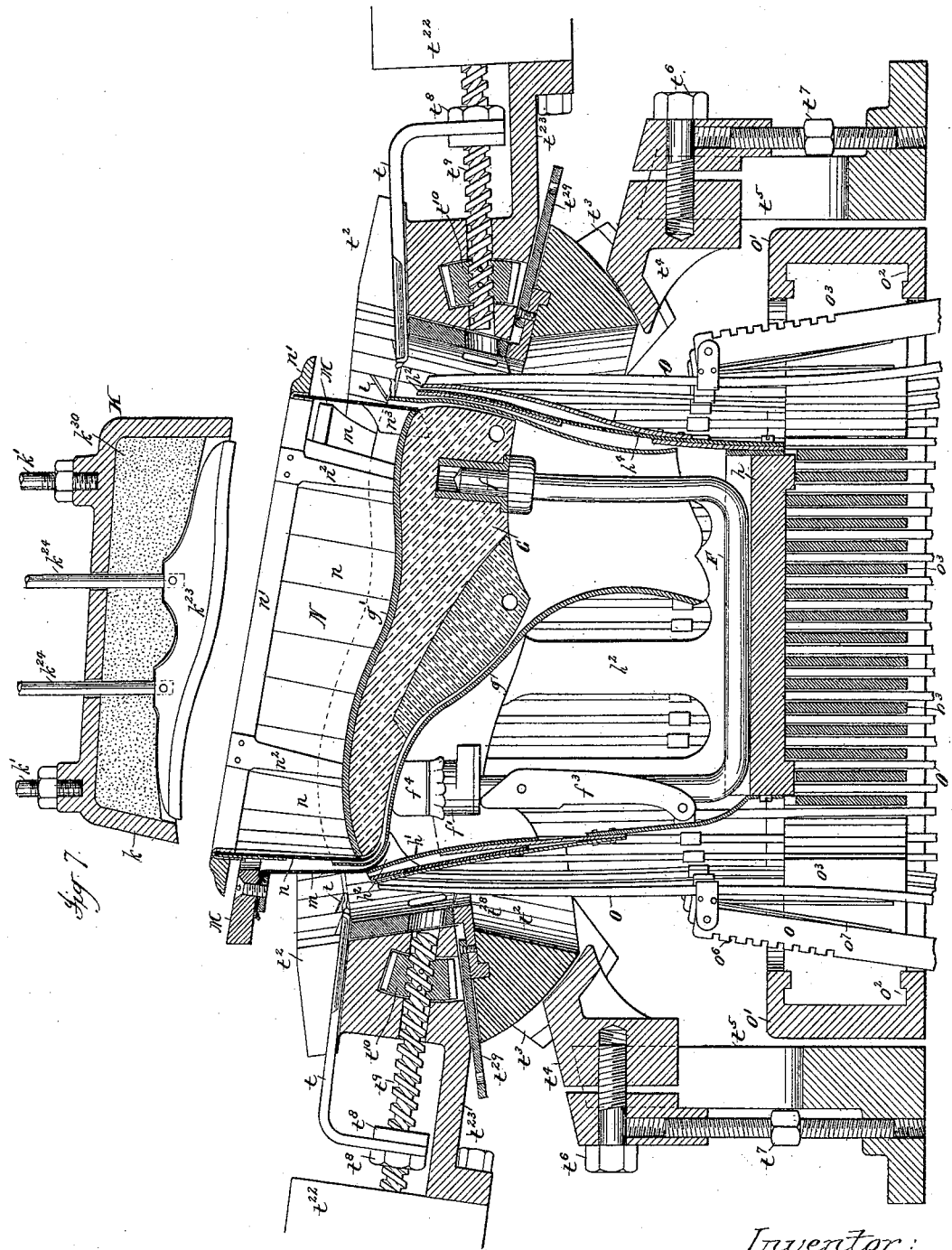
Figure 8:
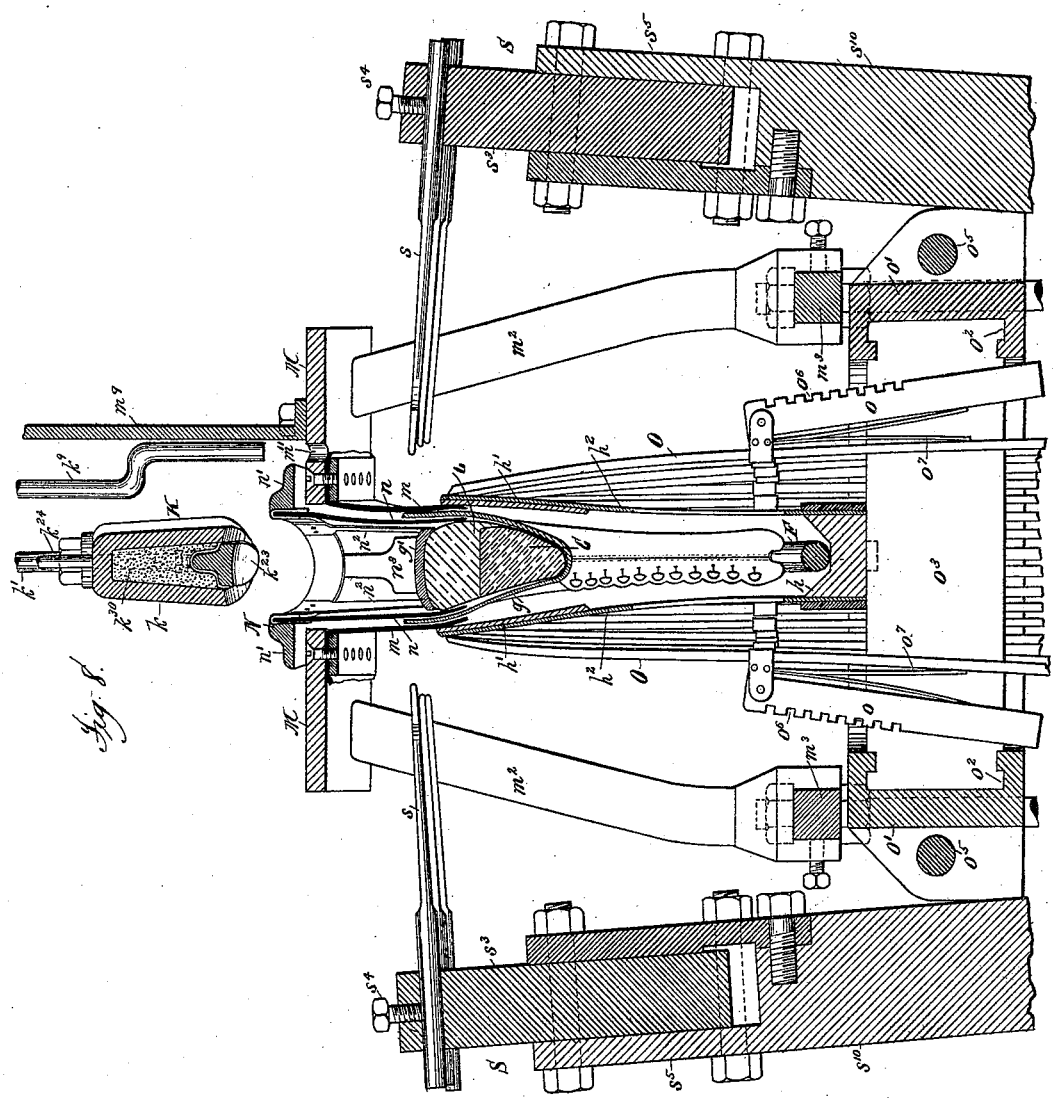
Figure 9:
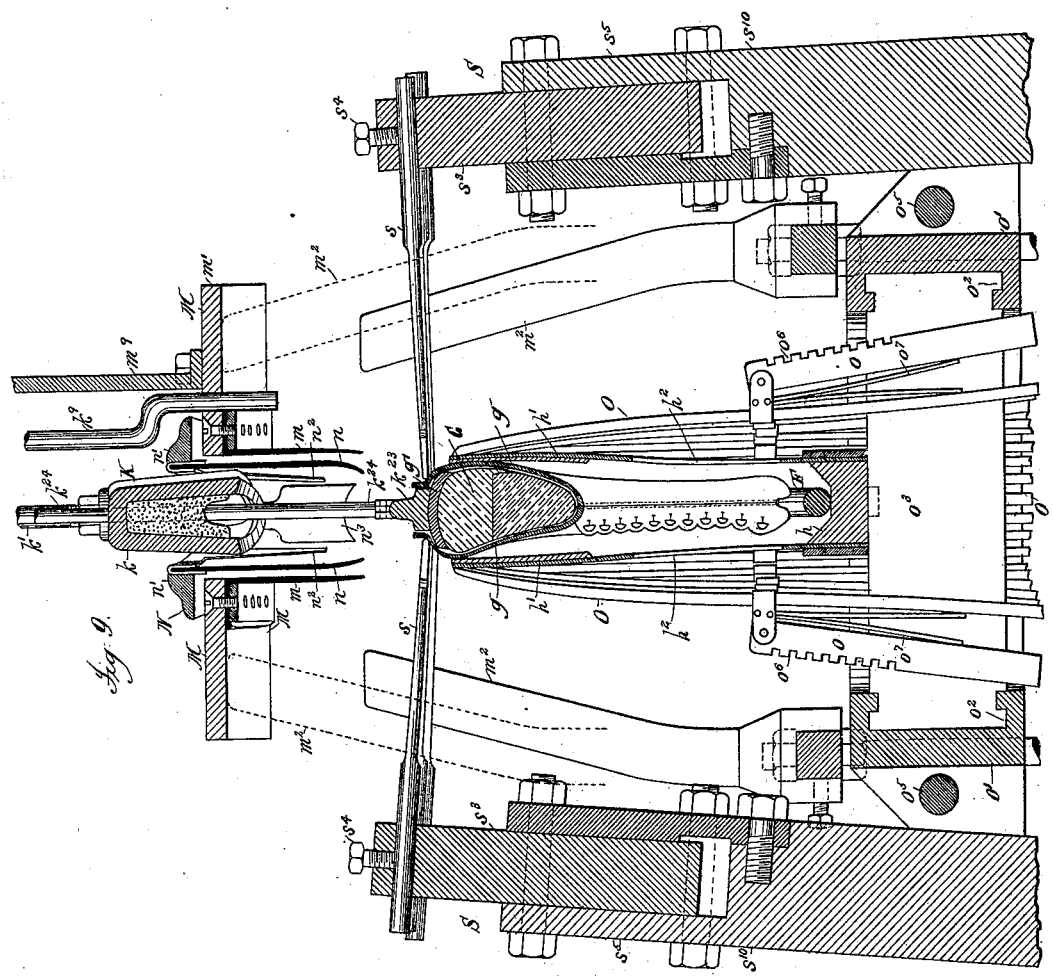
Figure 10:
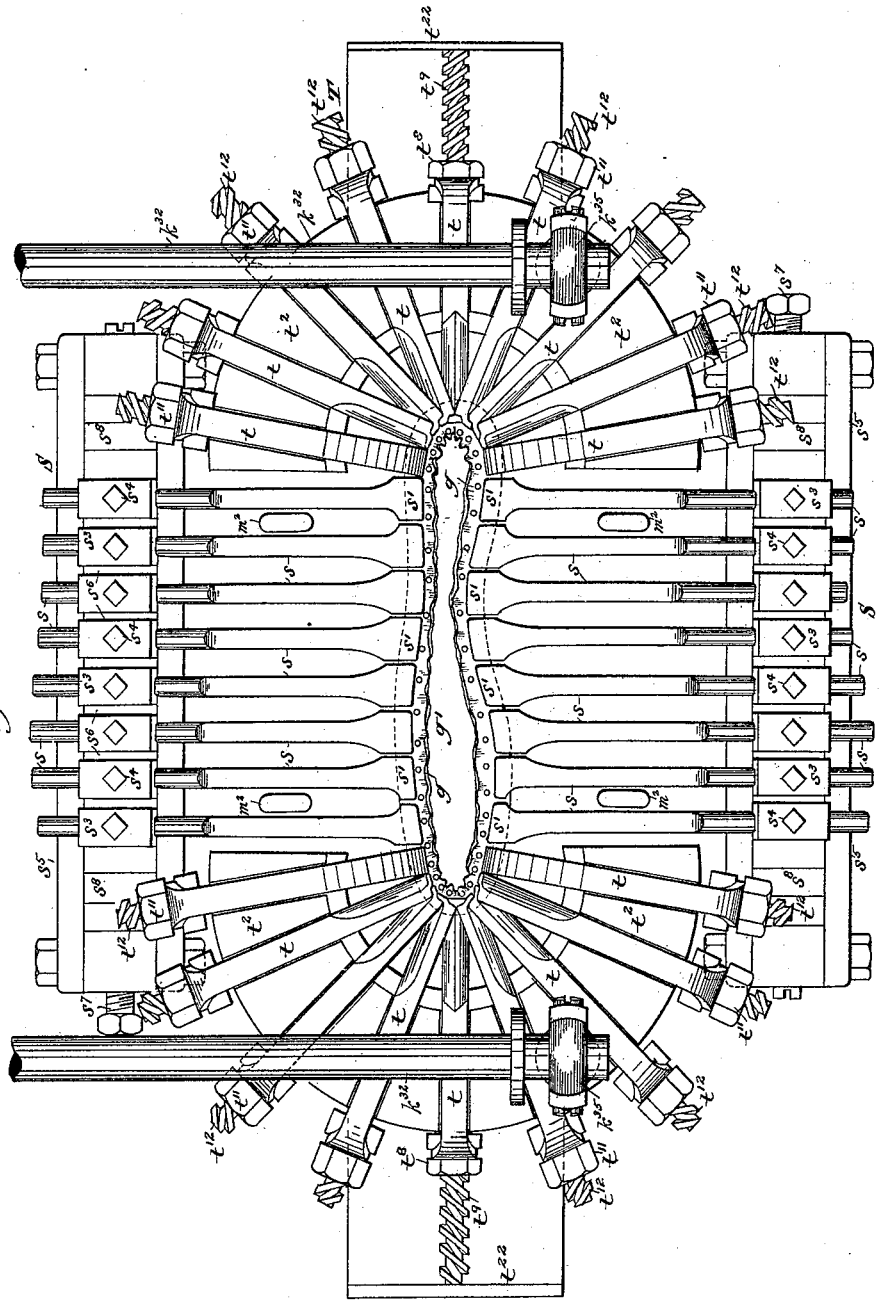
Figure 27:
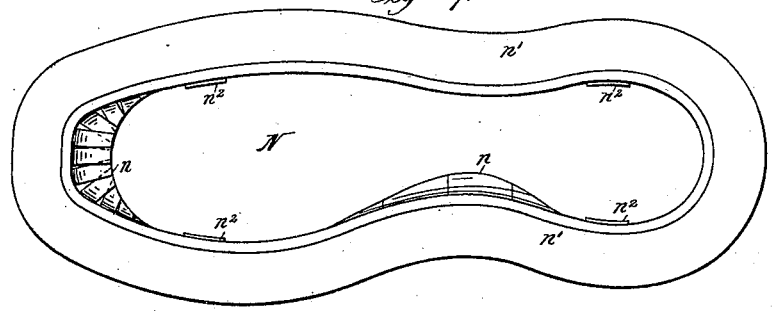
Figure 28:
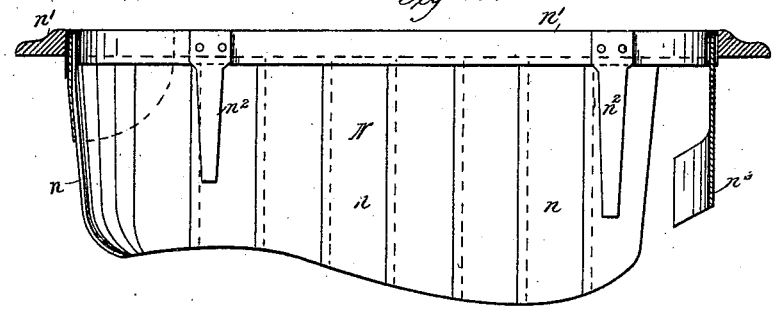
Figure 26:
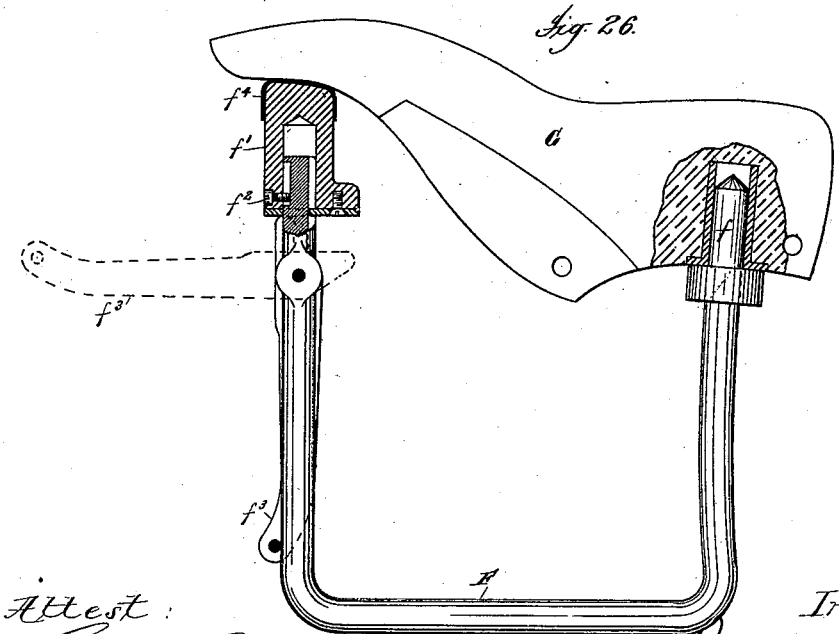

Figure 1 is a front elevation of an organized lasting-machine embodying the present invention, the parts being shown in the position they will occupy after the last and jack have been introduced into the machine and before the downhold mechanism has been moved into position over the last. Fig. 2 is an end elevation looking from the left of Fig. 1, the parts being in the same position. Fig. 3 is a plan view of the machine, the parts being in the same position as in Figs. 1 and 2. Fig. 4 is an enlarged end elevation, partly in section, of the mechanism for operating the downhold after it has been moved into position to bring the downhold over the last. Fig. 5 is an enlarged front elevation of the same parts in the same position. Fig. 5ª is a section taken on the line 5 of Fig. 5. Fig. 6 is an enlarged plan view, partly in section, of the crimpers and the stretchers, the parts being in the same position as in Figs. 1, 2, and 3. Fig. 7 is an enlarged longitudinal section of the heel and toe crimpers, the stretchers, the downhold, the support for the pressers, and the shield, the parts being in the same position as in Figs. 1, 2, and 3. Fig. 8 is an enlarged cross-section of the downhold, the side-crimpers, the stretchers, the shield, and the support for the pressers, looking toward the heel of the last, the parts being in the same position as in Fig. 7, except that the downhold is in position above the last. Fig. 9 is a view similar to Fig. 8, showing the parts in the position they will occupy after the stretching has been effected, the outer downhold raised, and the crimpers advanced so as to nearly complete the folding. Fig. 10 is a view similar to Fig. 6, showing the crimpers in the position they will occupy after the folding has been completed and while the upper is being secured to the insole. Fig. 11 is an enlarged plan view, partly in section, of the toe-crimper. Fig. 12 is a vertical section of the same, taken on the line 12 of Fig. 11. Fig. 13 is an elevation of the connections for imparting a rising-and-falling movement to the fingers of the heel and toe crimpers. Fig. 14 is an enlarged vertical section of the support for the lateral pressers, showing also the head for operating them. Fig. 15 is a horizontal section of the support for the pressers, all of the presser-fingers except two being, however, removed to show the other parts more clearly. Fig. 16 is an enlarged vertical section of the mechanism for moving the head which operates the pressers, the head being shown in its raised position. Fig. 17 is a cross-section of the same parts in the same position. Fig. 18 is an enlarged end elevation of the connections for operating the stretchers, the parts being shown in their depressed position. Fig. 19 is an enlarged side elevation, partly in section, of said connections in the same position. Fig. 20 is a cross-section taken on the line 20 of Fig. 18. Fig. 21 is an enlarged end elevation of the side-crimpers and the connections for operating them, showing the parts in their normal position. Fig. 22 is an enlarged side elevation of said connections in the same position, showing the head which carries one of the crimpers in section. Fig. 23 is an enlarged plan view of the shield which is interposed between the pressers and the outer rubbing-stretcher. Fig. 24 is a side elevation of the same. Fig. 25 is an end elevation of the same. Fig. 26 is an enlarged side elevation, partly in section, of the jack which supports the last. Fig. 27 is an enlarged plan view of the inner rubbing-stretcher. Fig. 28 is a longitudinal section of the same. Fig. 29 is an enlarged plan view of the outer rubbing-stretcher. Fig. 30 is a longitudinal section of the same. Fig. 31 is an enlarged plan view of one of the fingers of the side-crimpers. Fig. 32 is an edge view of the same. Figs. 33 and 34 are enlarged perspective views of two of the fingers of the heel and toe crimpers. Fig. 35 is an enlarged perspective view of one of the fingers of the lateral pressers. Fig. 36 is an enlarged sectional view of the clutch mechanism for starting and stopping the machine. Fig. 37 is a section taken on the line 37 of Fig. 36. Fig. 38 shows a detail of the clutch. Figs. 39 and 40 are views similar to Figs. 7 and 8, illustrating the stretching mechanism provided with an intermediate stretcher to act between the upper and the lining of the upper.

Referring to said drawings, it is to be understood that the working parts of the machine are supported upon a suitable framework, A, the top of which forms a bed-plate, B, for supporting the principal parts of the machine at a convenient height for the operator. The frame-work A affords bearings for a main driving-shaft, C, having a driving-pulley, D, which receives motion from any suitable source of power and from which motion is communicated to the various mechanisms of the machine. The movements of certain parts of the machine are derived directly from the main shaft C, as will be hereinafter explained; but the movements of the principal mechanisms are derived directly from a counter-shaft, E, which receives motion from the main shaft through engaging gears $c\ e$, with which the shafts are provided, these gears being so proportioned, for a purpose that will also be hereinafter explained, that five revolutions of the main shaft are required to produce one complete revolution of the counter-shaft.

The construction and to some extent the operation of the several mechanisms composing the complete machine will for convenience be first described in the order before mentioned, after which the operation of the complete machine will be explained.

The mechanism for supporting the last and holding it in position during the stretching and folding operations consists, as before explained, of an under support and a downhold. The under support for the last consists of a jack, F, (see Figs. 7, 8, 9, and 26,) which is of a form approximating yoke-shaped. One arm of the jack forms a stud, $f$, which enters an opening formed in the heel of the last G, while the other arm of the jack is provided with a clamp composed of a sliding head, $f'$, which is retained in position by means of a stud, $f^2$, which enters a recess in the arm of the jack and is acted on by a pivoted cam-lever, $f^3$, the end of which engages the head in such manner as to force it against the toe portion of the last with sufficient pressure to hold the jack in position, and also to hold the upper firmly against the last and prevent it from being displaced by any inequality in the strain upon its opposite sides during the stretching operation. The end of the head $f'$ which comes into contact with the upper upon the last will preferably be provided with a covering of leather or other soft material, $f^4$, which will prevent injury to the upper. This jack is entirely detached from the other parts of the machine, and is placed upon the last after it has been covered with the upper and before it is introduced into the machine.

The jack carrying the last is placed in the machine in the position shown in Figs. 7, 8, and 9, where it rests in a suitable seat formed in the base $h$ of the shield H, which will be hereinafter referred to.

The downhold K for the last consists (see Figs. 1, 2, 3, 4, 5, 5$^a$, 7, 8, and 9) of two members, termed, respectively, the "outer downhold" and the "inner downhold." The outer downhold, $k$, is of a size and shape to conform substantially to the size and shape of the bottom of the last and to bear upon the insole $g'$ very near its edge and around its entire circumference. This member of the downhold is suspended from two rods, $k'$, the upper ends of which are adjustably secured to a cross-bar, $k^2$, which is arranged to move vertically upon rods $k^3$, which are provided with springs $k^4$, by which the bar and the outer downhold are normally held in a raised position away from the last to permit the latter to be readily introduced into and removed from the machine.

Supported upon the rods $k^3$ above the bar $k^2$ are the bearings of a shaft, $k^5$, having a pair of cams, $k^6$, which are arranged to act upon the bar $k^2$ in such manner as to force it downward and depress the outer downhold onto the bottom of the last. The shaft $k^5$ is provided with a spring, $k^7$, one end of which is attached to a collar fast upon the shaft, while the other end is attached to a collar which is loose upon the shaft and is provided with an arm, $k^{11}$, which engages with a stud projecting from a fixed bearing, $k^{26}$, which will be presently referred to. The spring $k^7$ is so arranged that its normal tendency is to turn the shaft $k^5$ and cams $k^6$ to such position as to allow the springs $k^4$ to elevate the bar $k^2$ and the outer downhold. The extent to which the spring $k^7$ is permitted to turn the shaft $k^5$ is limited by means of stops $k^{11}$, which are secured to the bearings of the shaft $k^5$ and project into the path of the cams.

For the purpose of rocking the shaft $k^5$ to depress the outer downhold the shaft is provided with a loose crank-arm, $k^{12}$, carrying a pivoted pawl-lever, $k^{13}$, which engages with a notch in a disk, $k^{14}$, fixed upon the end of the shaft $k^5$. The pawl-lever $k^{13}$ is normally held in position to engage with the notch in the disk $k^{14}$ by means of a spring, $k^{15}$. When the shaft $k^5$ and cams $k^6$ have been rocked by the spring $k^7$, so as to raise the outer downhold, it is only necessary, in order to depress the outer downhold, to rock the crank-arm $k^{12}$ upward to the position shown by dotted lines in Fig. 4, so as to permit the pawl-lever $k^{13}$ to engage with the notch in the disk $k^{14}$, and then rock said lever back to its pendent position, thereby rocking the shaft $k^5$, so as to cause the cams $k^6$ to depress the bar $k^2$.

The crank-arm $k^{12}$ is provided with a suitable handle, $k^{16}$, by which it can be operated as just described, and for the purpose of retaining the outer downhold in its depressed position the lever is provided with a spring-pressed locking-pin, $k^{17}$, which is arranged to enter an opening in a plate, $k^{18}$, secured to the lower end of the rod $k^3$. Whenever the outer downhold is in its depressed position and it is desired to raise it from the last, it is only necessary to press the lower end of the pawl-lever $k^{13}$, so as to disengage the lever from the notch in the disk $k^{14}$. The spring $k^7$ will then rock the shaft $k^5$, so as to permit the springs $k^4$ to raise the bar $k^2$ and the outer downhold. The tripping of the pawl-lever $k^{13}$ is accomplished at the proper time by means of a tripping-lever, $k^{19}$, which is fulcrumed upon the collar $k^{31}$, which supports the rod $k^3$ and engages with a spring-lever, $k^{20}$, secured to the pawl-lever, and is acted on by an adjustable tappet, $k^{21}$, carried by one of the side-crimpers, and which, during the inward movement of the side-crimper, engages with the lever $k^{19}$ and trips the pawl-lever at the proper time relatively to the folding operation.

To cushion the blow which would be occasioned by the sudden upward movement of the bar $k^2$ by the springs $k^4$, there are provided buffers $k^{44}$, which are interposed between the bar $k^2$ and the bearings of the shaft $k^5$. To overcome the momentum of the shaft $k^5$, due to the action of the spring $k^7$, the disk $k^{14}$ is provided opposite the notch in which the pawl-lever engages with a cam-shaped lobe, $k^{22}$, which, as the disk is revolved by the action of the spring $k^7$, engages with the end of the pawl-lever and rocks said lever against a rubber buffer, $k^{42}$, thereby causing said buffer to resist the force of the spring $k^7$, and thus cushion and arrest the parts without shock.

The inner downhold, $k^{23}$, is of substantially the same form as the outer downhold, but smaller, and is arranged to telescope into a recess formed for its reception in the under side of the outer downhold. The inner downhold is supported upon a vertical rod or rods, $k^{24}$, which pass through the outer downhold and through openings formed in a plate or plates carried by the bar $k^2$, and also through openings formed in flanges projecting from an arm, $k^8$, which is supported loosely upon the shaft $k^5$, and is held in a horizontal position by a guide-rod, $k^9$, which is fixed to the arm $k^8$ and moves in an opening formed in an arm, $k^{10}$, projecting from the bar $k^2$. The rods $k^{24}$ are connected at their upper ends by a cross-bar, and are provided with springs $k^{25}$, which are interposed between said cross-bar and the flanges of the arm $k^8$, and which tend to normally hold the inner downhold in its raised position and within the recess formed in the bottom of the outer downhold. From this construction it will be seen that whenever the outer downhold is depressed by the action of the cams $k^6$ the inner downhold will be engaged by the outer downhold and depressed with it. It will also be seen that whenever the outer downhold is raised by the action of the springs $k^4$ the springs $k^{25}$ will also tend to raise the inner downhold and cause it to follow the upward movement of the outer downhold.

For the purpose of retaining the inner downhold in its depressed position after the outer downhold has been raised the arm $k^8$ (see Fig. 5$^a$) is extended upon the opposite side of the shaft $k^5$ and supports the bearings $k^{26}$ of a vertical shaft, $k^{27}$, having a horizontal crank-arm, $k^{28}$, which is arranged to be swung forward so as to be brought into engagement with a head, $k^{29}$, secured to the upper ends of the rods $k^{24}$, these parts being so arranged that when the inner downhold is in its depressed position upon the bottom of the last the arm $k^{28}$ can be swung into position to engage with the head $k^{29}$ and retain the inner downhold in that position after the outer downhold has been released and raised, as before described. The head $k^{29}$ is capable of a limited vertical movement upon the rod $k^{24}$, and is supported by a stiff spring, $k^{43}$, which may be slightly compressed when the arm $k^{28}$ is swung over the head $k^{29}$, thus compensating for slight differences in the thickness of insoles.

When it is desired to release the inner downhold and allow it to be raised away from the last, all that is necessary is to swing the arm $k^{28}$ to one side to the position indicated in Figs. 4 and 5, whereupon the springs $k^{25}$ will operate to raise the inner downhold. To cushion the blow of the inner downhold when it is raised by the springs $k^{25}$, the recess in the outer downhold, which receives the inner downhold, is provided with a sheet of rubber or other elastic buffer, $k^{30}$, which is interposed between the two members of the downhold. This buffer is of such thickness that when the two members of the downhold are depressed by the action of the cams $k^6$ the inner downhold will be brought into contact with the bottom of the last slightly in advance of the outer downhold, thereby causing the buffer to be slightly compressed, so as to force the inner downhold against the last with a yielding pressure.

The rods $k^3$, which support the downhold mechanism, are supported in sockets formed upon sleeves $k^{31}$, which are supported by and are capable of movement upon horizontal rods $k^{32}$, thereby permitting the downhold mechanism to be moved forward and backward to and from its position over the last, as indicated in Figs. 2, 3, and 4. For the purpose of retaining the downhold mechanism in either position to which it is shifted the tripping-lever $k^{19}$ is provided with a catch, $k^{38}$, which projects over the rod $k^{32}$ and engages with recesses $k^{39}$, formed in the rod, in such manner as to prevent the downhold mechanism from being shifted from either position until the tripping-lever has been rocked so as to remove the catch $k^{38}$ from the recess of the rod. The rods $k^{32}$ are supported at their rear ends in adjustable bearings $k^{33}$, secured to the upper ends of standards $k^{34}$, which rise from the bed-plate B, and at their forward ends in pivoted bearings $k^{35}$, which are supported upon the heads which carry the fingers of the heel and toe crimpers, as will be hereinafter explained.

The mechanism for stretching and conforming the upper around the last and for holding it in its stretched condition during the operation of folding its edge over onto the bottom of the last consists, primarily, as before explained, of a rubbing stretcher or stretchers and lateral pressers. Ordinarily there will be two of the rubbing-stretchers employed—an outer stretcher and an inner stretcher—and such an organization will therefore be first described. The outer rubbing-stretcher, M, (see Figs. 1, 3, 6, 7, 8, 9, 18, 19, 29, and 30,) consists of a strip of leather or other similar flexible material, $m$, which forms the stretcher proper, and is of sufficient length to extend around the toe portion of the last and along its sides as far toward the heel as it is necessary to stretch the upper in the lasting operation. The strip $m$, which will preferably be continuous, but may be made up of a number of sections, hangs freely from a head-plate, $m'$, which is of approximately U form, the opening in the head-plate being of a shape to conform approximately to the outline of the toe portion of the last as far rearward as it is desired to stretch the upper.

The outer stretcher is disconnected from the other parts of the machine and during the stretching operation rests upon the upper ends of vertical standards $m^2$ in such position that the strip $m$ surrounds the toe portion of the last outside the upper. The standards $m^2$ are supported upon horizontal bars $m^3$, which in turn are supported upon vertical rods $m^4$, which pass through bearings in the bed-plate B and are connected to cross-heads $m^5$, which reciprocate in bearings $m^8$, formed in the frame-work A. The cross-heads $m^5$ are provided with bowls $m^6$, which are acted upon by cams $m^7$ upon the shaft E in such manner as to cause the cross-heads and the parts connected thereto, together with the outer stretcher, M, to make an upward movement at each revolution of the shaft E.

The head-plate $m'$ is provided upon its upper side with a vertical standard, $m^9$, which is so positioned that when the outer stretcher has been placed in proper position upon the standards $m^2$ and the downhold is brought forward it will enter a guide, $k^{36}$, formed upon the end of the arm $k^{10}$. The upper end of the standard $m^9$ is provided with a ratchet, $m^{10}$, (see Fig. 4,) which, as the stretcher is raised by the action of the cams $m^7$, enters a recess formed in the end of the arm $k^8$, where it is engaged by a pawl-catch, $k^{37}$, so as to be retained in its raised position when the standards $m^2$ are lowered after the stretching operation.

The plate $m'$ is provided with an opening, $m^{11}$, into which the lower end of the guide-rod $k^9$ enters when the stretcher is raised, and thus enables the rod to hold the stretcher in a horizontal position while suspended by the catch $k^{37}$, as shown in Fig. 9.

The inner rubbing-stretcher, N, (see Figs. 1, 3, 6, 7, 8, 9, 27, and 28,) is somewhat similar in construction to the outer stretcher, and, like the outer stretcher, is disconnected from the other parts of the machine. The stretcher proper may consist of a strip of leather or other flexible material secured to a head-plate similar in form to the head-plate of the outer stretcher; but in the preferred form, which is herein illustrated, it is so constructed as to be applied to the last after the latter has received the upper and been placed upon the jack and before it is introduced into the machine. For this purpose the inner stretcher proper is composed of a series of narrow or comparatively narrow strips, $n$, of thin elastic sheet metal or other elastic but comparatively stiff material, which are secured to a head-plate, $n'$, having a central opening of proper size and shape to permit the passage through it of the downhold. The strips $n$ are comparatively narrow and are preferably arranged to overlap each other slightly at their edges, as indicated in Fig. 28. These strips are so arranged as to conform to the outline of the bottom of the last and are curved inward slightly at their lower ends at the toe portion, so as to fit under the edge of the last and grasp it slightly. The inner rubbing-stretcher is placed upon the last, preferably after the latter has received the upper and been placed upon the jack, and before being introduced into the machine, by springing the lower ends of the metal strips $n$ over the edge of the last, so as to introduce them between the last and the upper $g$.

In order to regulate the extent to which the ends of the strips $n$ shall be introduced between the last and the upper, and also to maintain the head-plate $n'$ at the proper distance from the bottom of the last at all points, the head-plate is provided with a number of depending legs, $n^2$, which project inward slightly from the strips $n$ and rest upon the bottom of the last when the stretcher has been placed upon it. The head-plate $n'$ is also preferably provided with a gage-plate, $n^3$, which depends over the heel portion of the last and serves as a gage to hold the insole $g'$ in proper position, as will be hereinafter explained. The head-plate $n'$ of the inner stretcher is somewhat wider than the opening in the head-plate $m'$ of the outer stretcher, so that when the two stretchers are in position for the stretching operation, as shown in Figs. 7 and 8, the head-plate of the inner stretcher will overlap the head-plate of the outer stretcher, and thus the raising of the outer stretcher by the action of the cams $m^7$ will bring the head-plate of the outer stretcher into engagement with the head-plate of the inner stretcher, so that the two stretchers will be raised together, as indicated in Fig. 9.

In practice it has been found desirable that there should be a limited amount of lost motion between the outer and inner stretcher, so that the outer stretcher will be moved a short distance and take up any slight slack in the upper and the strip $m$ before the movement of the inner stretcher commences. To provide for this, the inner stretcher is so formed that when it is introduced into the machine its head-plate $n'$ will be raised a short distance from the head-plate $m'$ of the outer stretcher, as best shown in Fig. 7, and so that the outer stretcher will be raised a short distance before commencing to raise the inner stretcher.

For this purpose and for the purpose of facilitating the operation of the machine the stretchers are preferably entirely disconnected; but they may be connected or secured to a common head-plate without departing from the invention.

Co-operating with the stretchers to give said stretchers a sufficient frictional hold upon the upper to secure the necessary rubbing action to properly stretch the same, and also to hold the upper in its stretched condition after the stretching operation and during the folding operation, and, incidentally, to properly center the last, are lateral pressers, which do not partake of the movement of the stretchers, and which exert a lateral pressure against said stretchers and the interposed upper at a point near the bottom of the last during and after the stretching operation. These pressers or pressing instrumentalities may be made in different forms; but in the preferred form, which is herein illustrated, they are composed of a series of presser-fingers, O, (see Figs. 1, 6, 7, 8, 9, 14, 15, 16, 17, and 35,) which surround the last with their upper ends in position to deliver their pressure against the circumference of the last near its bottom. The fingers O are pivoted on adjustable supports $o$, which are locked in a frame, $o'$, supported upon the bed-plate B.

The frame $o'$ is of substantially oval form, as shown in Fig. 15, and is provided around its inner periphery with a dovetailed recess, $o^2$, into which are fitted so as to move freely therein a series of locking-plates and blocks $o^3$ $o^4$, between which the supports $o$ are clamped. The plates $o^3$ extend across from side to side of the frame; but the blocks $o^4$, which are at the ends of the frame, are of sector form, tapering from the frame inward.

For the purpose of locking the supports $o$ in any position to which they are adjusted the frame $o'$ is made in sections, and is provided with locking bolts and nuts $o^5$, by which the parts of the frame can be drawn together, so as to press together the plates and blocks $o^3$ $o^4$ and cause them to clamp the supports $o$. By loosening the nuts of the bolts $o^5$ the clamping plates and blocks will be allowed to separate, so as to loosen the supports $o$ and allow them to be shifted to adjust the presser-fingers O.

For the purpose of readily adjusting the supports $o$ they are provided upon their outer sides with recesses $o^6$, into which a small lever or other tool can be inserted, so as to move them readily, while they are still held between the clamping plates and blocks with sufficient friction to prevent them from becoming displaced by their own weight.

The fingers O extend downward, passing through the spaces between the clamping plates and blocks, in which spaces they move freely, the fingers being slightly thinner than their supports $o$. The fingers are provided with springs $o^7$, located between the fingers and their supports $o$, which operate to normally rock the upper ends of the fingers away from the sides and ends of the last.

For the purpose of closing the fingers around the last to cause them to press the stretchers and the interposed upper against the last, as before explained, there is provided an oval wedge-shaped head, $o^8$, which is arranged to enter between and act upon the lower ends of the fingers O, so as to force them outward, and thus cause their upper ends to be correspondingly forced inward around the last. The head $o^8$ is mounted upon a vertically-reciprocating cross-head, $o^9$, which moves in guideways formed in the frame-work A, and is provided with a bowl, $o^{10}$, which is acted upon by a cam, $o^{11}$, upon the counter-shaft E, so that at each complete revolution of the counter-shaft the head $o^8$ is caused to make an up and a down movement, thereby causing the presser-fingers to move to and from the last. The head $o^8$ is capable of vertical adjustment to vary the pressure of the lateral pressers upon the stretchers, for which purpose the bowl $o^{10}$ is mounted in a vertically-adjustable bearing, $o^{12}$, having a threaded rod, $o^{13}$, upon which works a nut, $o^{14}$, upon the upper side of which rests the cross-head $o^9$. The nut $o^{14}$ is provided around its periphery with a worm-gear, $o^{15}$, which is engaged by a worm, $o^{16}$, formed upon a shaft, $o^{17}$, which turns in bearings in the cross-head, and is provided with a suitable handle, by which it can be operated so as to turn the nut $o^{14}$, and thus regulate the vertical position of the head $o^8$.

In order to adjust the head $o^8$ to conform to lasts of different lengths, it is preferably made in sections, as 2 3 4, which are adjustable with relation to each other, so that by inserting or removing one or both of the sections 3 the head can be lengthened or shortened to conform to lasts of different lengths.

In order to prevent any possibility of the upper becoming injured or marred by contact with the presser-fingers after the withdrawal of the stretchers, and also to equalize and distribute the pressure of the presser-fingers, it has been found desirable to provide a shield which surrounds the last and is interposed between the presser-fingers and the outer stretcher. This shield is not essential to the successful operation of the machine; but it has been found preferable to employ it in most cases, and particularly when operating upon the finer grades of uppers. This shield H (see Figs. 6, 7, 8, 9, 23, 24, and 25) consists, primarily, of pieces $h'$, of leather or other slightly soft flexible material, which conform in outline to the sides and heel and toe of the last, and are arranged so as to be interposed between the presser-fingers and the outer stretcher when the various parts are in position for the closing of the presser-fingers around the last.

The pieces $h'$, forming the side and heel and toe portions of the shield, are made independent, as shown in Fig. 23, and are arranged so as to overlap each other as they are pressed inward and closed around the last.

The presser-fingers are so adjusted that as they are closed around the last the fingers at the heel and toe will close slightly in advance of those at the sides, thereby pressing inward the heel and toe portions of the shield slightly in advance of the side portions, so that the latter portions will overlap the heel and toe portions without wrinkling.

The pieces $h'$, which form the shield proper, are supported upon elastic metal plates $h^2$, which rise from a base, $h$, which rests upon the clamping-plates $o^3$, and extend nearly or quite to the upper edges of the shield-pieces $h'$, so as to receive the pressure of the presser-fingers and distribute it more evenly over the shield-pieces $h'$.

In addition to the pieces $h^2$, the heel and toe portions of the shield are provided with curved metallic plates $h^3$, which are supported upon spring-arms $h^4$, and are so shaped that as they are forced inward by the presser-fingers they act to close the heel and toe portions of the shield to cause them to conform to the curvature of the last at those points, and thus lie smoothly inside the side portions of the shield. The resiliency of the plates $h^2$ is such that as soon as the presser-fingers are withdrawn from the last the shield is caused to open out, as indicated in Figs. 23, 24, and 25, so as to permit of the ready introduction and removal of the last and jack. The shield H, the same as the stretchers and the jack, is disconnected from the other parts of the machine, so that it can be inserted and removed at pleasure.

The mechanism for folding over the upper at the sides of the last consists, primarily, of two side-crimpers, S, one for each side of the last. These crimpers and the connections for operating them are exact duplicates, and a description of one will therefore apply to both. The side-crimpers (see Figs. 1, 2, 3, 6, 8, 9, 10, 21, 22, 31, and 32) consist, primarily, of series of crimping-fingers $s$, arranged upon opposite sides of the last and operated to move inward simultaneously and engage with and fold over the upwardly-projecting edge of the upper. The fingers of each crimper are arranged side by side, so as to present a practically-uninterrupted edge to act upon the upper. The inner ends, $s'$, of the fingers of the side-crimpers, which act upon the upper, are flattened and provided with blunt rounded edges to prevent breaking or marring the upper. The outer ends of these fingers have small round shanks $s^2$, which enter openings in head-blocks $s^3$, and are secured therein by set-screws $s^4$ in such manner that the fingers can be adjusted to any required distance from the last, and can be turned so as to bring their inner ends to the proper angle to conform to the outline of the bottom of the last. The head-blocks $s^3$ are carried in vibrating heads $s^5$, in which they are independently adjustable vertically to bring the several fingers of the side-crimpers to the proper height to conform to the bottom of the last. For this purpose the heads $s^5$ are provided with chambers, in which the blocks $s^3$ are placed loosely side by side, the several blocks being preferably separated by thin plates $s^6$, and the whole being locked in position by set-screws $s^7$. The spaces in the ends of the chambers not occupied by the blocks $s^3$ are filled with loose blocks $s^8$.

The number of the blocks $s^3$ and fingers employed will be determined by the character of the work, and can be varied at pleasure. By loosening the set-screws $s^7$ the head-blocks can be loosened, so as to permit them to be readily adjusted vertically to the required position.

To provide sufficient pressure upon the head-blocks to prevent them from being displaced by their own weight during the operation of adjustment, the heads $s^5$ will preferably be provided with springs $s^9$, which will act against the series of blocks with sufficient force to hold the head-blocks temporarily in any position to which they are adjusted.

The heads $s^5$ are carried upon the ends of oscillating arms $s^{10}$, which are fulcrumed upon shafts $s^{11}$, supported beneath the bed-plate B, and are provided at their lower ends with swivels $s^{12}$, to which are connected the rods of a pair of eccentrics, $s^{14}$, mounted upon the counter-shaft E. The eccentric-rods $s^{13}$ are threaded, and are provided with nuts upon opposite sides of the swivels $s^{12}$, by which the length of the rods can be adjusted, and thus vary the points which the fingers $s$ of the side-crimpers will reach upon their inward vibrations. By this means the fingers of the side-crimpers are caused to vibrate to and from the last at each complete revolution of the counter-shaft E. As the fingers are vibrated inward to effect the folding over of the upper at the sides of the last, it is desirable that they should pass over the edge of the insole at such a height that there will be no danger of the ends of the fingers abutting against the edge of the insole, and thus displacing it, and perhaps tearing the edge of the upper. It is also desirable that immediately after the ends of the fingers have passed over the edge of the insole they should be lowered slightly, so as to press and hold the folded-over edge of the upper firmly against the insole to produce a smooth and perfect fold. To produce this movement of the fingers, the shafts $s^{11}$ are provided with eccentrics $s^{15}$, upon which the arms $s^{10}$ are fulcrumed, and the shafts $s^{11}$ are also provided with arms $s^{16}$, which carry adjustable nuts $s^{17}$, which are connected by threaded rods $s^{18}$ with arms $s^{19}$, which are rigidly connected to the bands of a pair of eccentrics, $s^{20}$, mounted upon the main driving-shaft C. By this means at each revolution of the shaft C the arms $s^{19}$ move the rods $s^{18}$, and through the arms $s^{16}$ and eccentrics $s^{15}$ impart a rising-and-falling movement to the fingers $s$ of the side-crimpers, and the movements of the shafts C and E are so timed with relation to each other, as will be hereinafter explained, that the rising movement thus imparted to the fingers takes place just as said fingers are about to pass over the edge of the insole upon their inward movement and that the falling movement of the fingers takes place immediately after the ends of the fingers have passed over the edge of the insole. The extent of the rising-and-falling movement thus imparted to the fingers can be regulated and determined with great nicety by varying the adjustment of the nuts $s^{17}$ and the distance between said nuts and the arms $s^{19}$.

The mechanism for folding over the material at the heel and toe of the last consists of heel and toe crimpers T, which operate, respectively, to fold over the upper at the heel and toe of the last. These two mechanisms and their operating devices are exact duplicates, and a description of one will therefore apply to both. Each of these crimpers consists, primarily, (see Figs. 1, 2, 3, 6, 7, 10, 11, 12, 13, 33, and 34,) of a set of crimping-fingers, $t$, which are of substantially the form shown in Figs. 33 and 34, and are arranged in radial recesses $t'$, formed upon the upper sides of the head-blocks $t^2$, which are of spheroidal form and rest in concave bearings $t^3$, formed upon vertically-adjustable heads $t^4$, which are supported on brackets $t^5$, rising from and adjustable upon the bed-plate B. The heads $t^4$ are locked in position on the brackets $t^5$ by means of locking-bolts $t^6$, and are provided with right and left hand screws, $t^7$, by which their vertical position can be adjusted, the head-blocks $t^2$ being at the same time adjusted in the concave bearings $t^3$ so as to maintain the fingers of the heel and toe crimpers at the proper angle both vertically and laterally with relation to the bottom of the last.

The fingers $t$ are caused to move independently, so as to converge as they approach the last and diverge as they recede from it. For this purpose one of the fingers of each crimper (preferably the middle one) is secured to a nut, $t^8$, which works upon a threaded rod, $t^9$, which is parallel to the finger and carries a fast gear, $t^{10}$, located in a recess in the head-block. The remaining fingers of each crimper are secured between jam-nuts $t^{11}$, which are fast upon threaded rods $t^{12}$, which are parallel with the fingers and pass through threaded openings in gears $t^{13}$, which are loose upon the rods and engage with each other and with the gear $t^{10}$. By this means any motion which is imparted to the rod $t^9$ will cause the nut $t^8$ to move inward or outward, as the case may be, upon the rod, and thus impart a corresponding movement to the finger $t$ attached to that nut, and at the same time the rod $t^9$ will, through the gear $t^{10}$, impart movement to the entire series of gears $t^{13}$, which, acting upon the threaded rods $t^{12}$, will impart a longitudinal movement to the remaining fingers of the entire series $t$. By this means the fingers $t$ of the heel and toe crimpers are caused to converge around the heel and toe of the last as they are moved inward and diverge as they are moved outward. The fingers $t$ are so formed at their inner ends that as they converge over the heel and toe of the last they overlap each other, as indicated in Fig. 10, and to accommodate this overlapping of the fingers in the best manner the middle finger of each crimper is beveled upon its opposite edges, as shown in Fig. 33, so as to be overlapped by the two adjoining fingers, as shown in Fig. 10, while the fingers upon each side of the middle one are beveled at one edge upon the upper side and at the other edge upon the under side, as shown in Fig. 34, so as to overlap each other, as also shown in Fig. 10.

The rod $t^9$ of each crimper is extended outward beyond the nut $t^8$, and is connected by a universal joint, $t^{14}$, to a short shaft, $t^{15}$, having a pinion, $t^{16}$, which is engaged by a rack-bar, $t^{17}$, which receives a reciprocating motion from a crank, $t^{18}$, operated from the counter-shaft E. The cranks $t^{18}$ for the two rack-bars are carried, respectively, by the gear $e$ and by a crank-arm, $t^{19}$, secured to the opposite end of the shaft.

The shafts $t^{15}$ are supported in bearings $t^{20}$, which are provided at their inner ends with spherical heads $t^{21}$, which enter sockets $t^{22}$, secured to brackets $t^{23}$, projecting from head-blocks $t^2$. The universal joints $t^{14}$ permit the head-blocks $t^2$ to be adjusted to different positions in the bearings $t^3$ to change the angle of the fingers $t$ without changing the positions of the shafts $t^{15}$, and the sockets $t^{22}$ are made in two parts, as indicated, so that they can be loosened to permit this adjustment of the head-blocks $t^2$, and can then be tightened upon the spherical heads $t^{21}$, so as to support the bearings $t^{20}$ rigidly.

It is found in practice desirable that the fingers of the heel and toe crimpers, the same as the fingers of the side-crimpers, should, after they pass over the edge of the insole, fall slightly as they continue their inward movement to complete the folding. To effect this the inner side of each of the heads $t^2$ is provided with a curved plate, $t^{24}$, which is arranged to have a slight vertical movement and is guided by ribs $t^{25}$, projecting from the head and entering recesses in the plate. The upper edges of these plates lie directly beneath the inner ends of the crimping-fingers $t$. The plates $t^{24}$ are provided with elongated openings $t^{26}$ for the passage of the rods $t^{12}$, and are provided upon their lower edges with inclines $t^{27}$, which are acted upon by corresponding inclines formed upon the upper sides of plates $t^{28}$, which are seated in recesses formed in the head-blocks and are capable of longitudinal movement, so as to raise and lower the plates $t^{24}$. The plates $t^{28}$ are provided with rearwardly-extending arms $t^{29}$, which are connected by links $t^{30}$ with pivoted levers $t^{31}$, which are fulcrumed upon the bed-plate B and are provided at their lower ends with swiveled nuts $t^{32}$, which receive threaded rods $t^{33}$, which also pass through nuts formed in arms $t^{34}$, rigidly connected to the bands of a pair of eccentrics, $t^{35}$, mounted upon the main shaft C. By this means at each revolution of the shaft C a rocking movement is imparted to the levers $t^{31}$, which movement is communicated through the links $t^{30}$ and arms $t^{29}$ to the plates $t^{28}$, thereby imparting a rising-and-falling movement to the plates $t^{24}$ and to the fingers $t$. The parts are so timed, as will be hereinafter explained, that the rising movement thus imparted to the fingers $t$ will take place just as said fingers are about to pass over the edge of the insole upon their inward movement, while the falling movement imparted to the fingers will take place immediately after they have passed over the edge of the insole.

The remaining features in the construction of the several mechanisms and the organization of the machine will be described in connection with an explanation of the manner of adjusting the machine for use and of its operation, which will now be given.

The manner of adjusting the machine for use is as follows: The machine which has been described is capable of operating in connection with lasts which vary greatly in size and configuration, and also with lasts for both the right and left foot. The machine is therefore, as will be seen from what has already been said, so constructed as to be capable of numerous adjustments for the attainment of these objects. It is contemplated, however, that in the practical operation of the machine it will not be necessary to change the adjustments frequently, as it will usually be desirable to last a large number of any particular size and style of boots or shoes for which the machine has been adjusted before changing the adjustments. The jack F, the shield H, and the inner and outer rubbing-stretchers, M N, are, as has been explained, disconnected from the other parts of the machine, and each machine will be provided with a sufficient number of these parts of different sizes and shapes to operate in connection with lasts for the right and left foot and to give the machine the required range of capacity. The two members of the downhold are also made detachable from their supporting-rods $k'$ $k^{24}$, and each machine will also be provided with a sufficient number of these parts of varying sizes. A last of the required size and style having been selected, it will be placed upon a jack, F, of a size to correspond with the last. A shield, H, of a size and shape to correspond with the last will be introduced into the machine in the position shown in the several figures of the drawings, and the jack carrying the last will be introduced into the shield so as to rest upon the base $h$, as shown in Figs. 7 and 8. The presser-fingers O will be so adjusted that when the head $o^8$ is raised their upper ends will close around the last in proper position, after which the supports of the fingers will be locked in position by tightening the nuts of the rods $o^5$. The length of the head $o^8$ will, if necessary, be adjusted by inserting or removing one or more of the sections 3, and the head will be adjusted to the proper height to close the fingers around the last with sufficient pressure.

Outer and inner downholds of the proper sizes and shapes to conform to the bottom of the last will be placed upon the supporting-rods $k'$ $k^{24}$, and the rods will be properly adjusted (which can be done by means of the nuts $k^{40}$) to cause the downhold when depressed to rest with proper pressure upon the bottom of the last, due allowance being of course made for the insole. The fingers $s$ and head-blocks $s^3$ of the side-crimpers will be so adjusted that the inner ends, $s'$, of the fingers will be at the proper angle to conform to the outline of the last, and so that the several fingers will be at the proper height to correspond to that part of the last over which they are to act. The eccentric-rods $s^{13}$ will, if necessary, be so adjusted as to give the proper movement to the side-crimpers, and the rods $s^{18}$ and nuts $s^{17}$ will also, if necessary, be adjusted to give the necessary rising-and-falling movement to the fingers of the side-crimpers.

The heel and toe crimpers will be adjusted to the proper height by the screws $t^7$, and to the proper distance from each other to conform to the length of the last by shifting the brackets $t^5$ upon the bed-plate. The crank-pins $t^{18}$ are of sufficient length to permit the rack-bars $t^{17}$ to shift their positions upon the pins to conform to the adjustments of the brackets $t^5$. The head-blocks $t^2$ will also be adjusted in their bearings $t^3$ to bring the fingers $t$ to the proper angle. The nut $t^8$ will be so adjusted upon the rod $t^9$ and the rods $t^{12}$ so adjusted in the gears $t^{13}$ as to cause the fingers $t$ to converge to the proper extent to conform to the size of the last. These latter adjustments can be effected simultaneously by throwing the rack-bars $t^{17}$ out of gear with the pinions $t^{16}$ and turning the shafts $t^{15}$ by hand until the fingers are properly adjusted, and then putting the racks back into gear with the pinions.

The various adjustments which have been referred to need not of course be made in the order named, but may be made in any order found most convenient.

The operation of the machine in lasting is as follows: At the commencement of the lasting operation the parts will be in their normal position, as shown in Figs. 1, 2, 3, 6, 7, 11, 12, 18, 19, 21, and 22—that is to say, the side and heel and toe crimpers will be in their retracted position, the presser-fingers will be opened out away from the shield, the downhold will be in its raised position, and the downhold mechanism will preferably be moved rearward upon the rods $k^{32}$, so as to carry the downhold away from its position over the last. The last G of the size to which the machine is adjusted, having been covered with an upper, $g$, will be placed upon the jack F. An inner rubbing-stretcher, N, of a size to conform to the last will then be placed upon the last, the lower ends of the strips $n$ being sprung over the edges of the last inside the upper and pressed downward until the legs $n^2$ rest upon the bottom of the last. An outer rubbing-stretcher, also of a suitable size to conform to the last, will be placed upon the standards $m^2$, with the lower edge of the stretcher proper, $m$, projecting downward inside the shield H, as best shown in Figs. 7, 8, 18, and 19. The last covered with the upper and carrying the jack and inner stretcher, as just described, will then be introduced into the shield, so that the edge of the upper will lie between the inner and outer rubbing-stretchers, and the head-plate of the inner stretcher overlap the head-plate of the outer stretcher, as best shown in Figs. 6, 7, and 8. The downhold mechanism will then be moved forward into position over the last, as shown in Figs. 4, 5, and 8, in which position it will be retained by the catch $k^{38}$. When the downhold mechanism is in this position, the standard $m^9$ of the outer stretcher will enter the guide $k^{36}$, and the guide-rod $k^9$ will be directly over the opening $m^{11}$ in the head-plate $m'$. The main driving-shaft C will then be set in motion and caused to make one revolution, thereby, through the gears $c$ $e$, causing the counter-shaft E to make one-fifth of a revolution. The cam $o^{11}$ is so shaped and set upon the counter-shaft that during this one-fifth of a revolution it will move from the position indicated by dotted lines in Fig. 17 to the position shown by full lines in said figure, thereby raising the head $o^8$, so as to spread the lower ends of the presser-fingers O, as shown in Figs. 14, 16, and 17, and cause the upper ends to close around the shield H and press it, together with the inner and outer stretchers and the interposed edge of the upper, against the last, as shown in Fig. 9.

Unless the last has already been provided with the insole $g'$ at the same time it is covered with the upper, the insole may be introduced through the opening in the head-plate $n'$ and dropped onto the bottom of the last, where it will be guided into and held in proper position by the legs $n^2$ and the gage-plate $n^3$, and this may be done either before the last is introduced into the machine or at any time before the downhold is lowered onto the bottom of the last. After the presser-fingers have been closed around the last the downhold K will be lowered, as described, and the crank-arm $k^{28}$ will be swung to the front, so as to pass over and engage with the head $k^{29}$, and thus hold the inner downhold in its depressed position after the outer downhold has been allowed to rise, as will be hereinafter explained. It will be quite obvious that the order of the operations which have been thus far described may be varied somewhat, if desired. The main driving-shaft C will then be again set in motion and caused to make two more revolutions, thereby causing the counter-shaft E to make two-fifths of a revolution and complete three-fifths of a revolution from the point of starting. The cams $m^7$ are so shaped and set upon the shaft E that during the first one-fifth revolution of said shaft they will impart no vertical movement to the cross-heads $m^5$ and standards $m^2$, upon which the outer stretcher is supported; but during the second fifth of a revolution of the shaft they will arrive at the position indicated by dotted lines in Fig. 18, thereby quickly raising the standards $m^2$ from the position shown in Figs. 8, 18, and 19 to the position shown by dotted lines in Fig. 9, and at the same time raising the outer and inner stretchers to the position shown in Fig. 9 and withdrawing them from between the shield and the upper and the last and upper, respectively. As the stretchers are thus withdrawn they have a rubbing action upon the edge of the upper interposed between them, which operates to stretch it evenly and smoothly around the last and cause it to properly conform thereto. This rubbing action is due to the friction between the stretchers and the upper produced by the pressure exerted by the presser-fingers forming the lateral pressers, which do not, as will be observed, partake of the movement of the stretchers, or, in other words, are stationary relatively to the movement of the stretchers.

The degree of pressure exerted by the lateral pressers determines the amount of friction between the stretchers and the upper, and consequently the extent to which the latter will be stretched, and this can be regulated and determined by the adjustment of the presser-fingers and the head $o^8$, and also by varying the area over which the pressure of the fingers is distributed. The stretching can also be varied by varying the extent to which the stretchers extend below the line of pressure exerted by the lateral pressers. By properly adjusting the fingers of the lateral pressers greater pressure can be exerted at some points than at others, and thus different portions of the upper can be stretched differently, if desired, to secure proper lasting in any case. As the stretchers are withdrawn, the presser-fingers O, which are slightly elastic, spring inward and continue to press the shield against the upper, so as to retain it in its stretched condition with its edge extending above the insole $g'$, as shown in Fig. 9. As the stretchers are raised, the standard $m^9$, moving upward in the guide $k^{36}$, enters the recess in the arm $k^8$, where the ratchet $m^{10}$ is engaged by the catch $k^{37}$, and at the same time the guide-rod $k^9$ enters the opening $m^{11}$, so as to retain the stretchers in their raised position after the standards $m^2$ have been lowered, as shown in Fig. 9. The eccentrics $s^{14}$ are so positioned upon the shaft E that during the first one-fifth of a revolution of that shaft the side-crimpers are moved outward slightly and then inward to the position from which they started, while during the next two-fifths of a revolution of the shaft the eccentrics operate to move the side-crimpers inward quite quickly to their extreme inner position, as shown in Fig. 10. As the side-crimpers move inward to this position, the crimping-fingers engage with the edge of the upper and fold it over onto the insole. The parts are so timed, however, that the ends of the crimping-fingers will not arrive in position to commence the folding over of the edge of the upper until just after the stretchers have been withdrawn. Directly after the withdrawal of the stretchers, and just before the fingers of the side-crimpers commence to press the edge of the upper over the edge of the insole, the tappet $k^{21}$, carried by the head of one of the side-crimpers, engages with the tripping-lever $k^{19}$ and trips the pawl-lever $k^{13}$, so as to allow the outer downhold to be raised, as indicated in Fig. 9. The crank-arm $k^{28}$ being, however, in engagement with the head $k^{29}$ will prevent the springs $k^{25}$ from raising the inner downhold, and will retain said downhold in contact with the insole, as also shown in said figure.

The cranks $t^{18}$ are set at right angles to the eccentrics $s^{14}$, so that during the first one-fifth of a revolution of the shaft E no effective movement will be imparted to the fingers $t$ of the heel and toe crimpers, while during the succeeding two-fifths of a revolution of the shaft the rack-bars $t^{17}$ are moved quickly upward, so as to cause the fingers of the heel and toe crimpers to move quickly inward to a position corresponding to the position of the fingers of the side-crimpers, as shown in Fig. 10. During the first and second revolutions of the shaft C the eccentrics $s^{20}$ and $t^{35}$ will, through the connections which have been described, impart a slight rising-and-falling movement to the fingers of the side and heel and toe crimpers. These fingers, however, being at that time out of contact with the upper, the rising-and-falling movement thus imparted to them will be simply an idle movement, producing no effect. During the third revolution of the shaft C and the corresponding third one-fifth of a revolution of the shaft E the eccentrics $s^{20}$ and $t^{35}$ will impart a similar rising-and-falling movement to the fingers of the crimpers. The parts are so timed, however, that the rising movement imparted to the fingers upon the third revolution of the shaft C will take place just before the fingers arrive at the edge of the insole, while the falling movement imparted to the fingers at the same revolution of the shaft C will take place just after the fingers have passed over the edge of the insole. After the folding has been completed the crank-arm $k^{28}$ will be moved to one side, so as to release the head $k^{29}$ and allow the springs $k^{25}$ to raise the inner downhold to the position shown in Figs.

5, 7, and 8. The downhold mechanism and the stretchers suspended therefrom may then be moved laterally on the rods $k^{32}$ to the position shown in Figs. 2 and 3, so as to leave the bottom of the last exposed for the further operations. The folded-over edge of the upper will then be secured in position by tacking or otherwise, as indicated in Fig. 10, which will complete the lasting operation.

The main driving-shaft C will then be set in motion and caused to make two complete revolutions, which will impart two-fifths of a revolution to the shaft E and complete a revolution of that shaft from the point of starting. During this portion of the revolution of the shaft E the cam $o^{11}$ will restore the head $o^8$ to its original position, thereby allowing the fingers O to be moved away from the last by the springs $o^7$, and the cams $m^7$ will restore the standards $m^2$ to their original position. The eccentrics $s^{14}$ and the cranks $t^{18}$ will also restore the fingers of the side and heel and toe crimpers to their retracted positions. The lasted shoe or boot will then be removed and the operation repeated.

From the foregoing it will be seen that three revolutions of the counter-shaft E are required to effect the lasting, after which it is desirable that the mechanisms should stop for a sufficient time to permit of the securing of the upper in position, and that two revolutions of the shaft C are required to restore the parts to their normal position, after which it is necessary that another stop should take place to permit of the removal of one last and the introduction of another. In the practical operation of the machine it is also desirable in many cases that there should be a slight stop after the first and second revolutions of the shaft C—that is to say, after the presser-fingers have been brought together around the last, and again after the stretching has been effected and the primary downhold raised.

In order to cause the mechanisms to make these movements and to dwell at the proper times, the driving-pulley D, through which motion is imparted to the shaft C, is connected to the shaft by means of a clutch mechanism which is operated by a hand-lever, so as to connect the pulley to the shaft when it is desired to set the mechanisms in operation, and in order to cause the mechanisms to dwell at the proper times this clutch mechanism is provided with an automatic tripping device, by which it is operated to disconnect the driving-pulley from the shaft at the end of each revolution.

The clutch mechanism consists, primarily, (see Figs. 1, 2, 3, 36, 37, and 38,) of a spring-pressed locking-pin, $d$, which is seated in the hub of the pulley D, and is arranged to enter a recess, $d'$, formed in a disk, $d^2$, fixed upon the shaft. The pin $d$ is provided with a recess, $d^3$, which is entered by a spring-pressed key, $d^4$, which works in a recess in the hub of the pulley, and is so arranged that when it enters the recess $d^3$ it prevents the locking-pin from entering the recess $d'$, and thus prevents the pulley from being clutched to the shaft.

For the purpose of operating the key $d^4$ to permit the pin $d$ to enter the recess $d'$ and clutch the pulley to the shaft the key is provided with a shoulder, $d^5$, which is arranged to be engaged by a cam-shaped shoe, $d^6$, which rests upon the periphery of the disk $d^2$, and is connected to a spring-pressed rod, $d^7$, having a shoulder, $d^8$, against which works a hand-lever, $d^9$, which projects in front of the machine in convenient position to be grasped by the operator. The pin $d$ is so located in the head of the pulley that its end projects slightly outside the periphery of the disk $d^2$ and in position to be engaged by an incline, $d^{10}$, formed upon the side of the cam-shaped shoe $d^6$, and thus force the pin out of the recess $d'$ at each revolution of the shaft.

The operation of the clutch mechanism is as follows: Assuming that the parts are in the position indicated in Figs. 36 and 37 and that it is desired to set the shaft in motion, the operator will depress the hand-lever $d^9$, so as to raise the rod $d^7$ against the tension of its spring and raise the shoe $d^6$ away from the periphery of the disk $d^2$. The driving-pulley being in motion, the lug $d^5$ of the key $d^4$ will, as it is carried around with the pulley, engage with the cam-shaped upper side of the shoe $d^6$, and, riding up on said cam-surface, will withdraw the key from the recess $d^3$, so as to release the pin $d$ and allow it to be forced into the recess $d'$ by its spring, thereby locking the pulley to the shaft and setting the latter in motion. The operator, as soon as the pulley has been thus clutched to the shaft, may release the hand-lever $d^9$, thereby allowing the shoe $d^6$ to be pressed against the disk $d^2$ by its spring. As the pulley and shaft complete a revolution and arrive at the position in which the clutching was effected, the inclined end of the pin $d$ will engage with the incline $d^{10}$ upon the side of the shoe $d^6$, so that the pin will be forced out of the recess $d'$ and unclutch the pulley from the shaft. As soon as the pin is thus forced out of the recess the key $d^4$ will enter the recess $d^3$ in the pin and prevent the pulley from being again clutched to the shaft until the hand-lever is again operated. It will be seen that by this means the shaft C can be set in motion and caused to make one revolution and be automatically arrested at the end of each revolution, and thus the several revolutions necessary for the complete lasting operation and the restoration of the parts to their normal positions can be effected and the necessary dwell secured after each revolution of the main shaft. It will be seen, however, from the construction that has been described, that it is necessary, in order that the shaft C shall be automatically arrested at the end of each revolution, that the operator shall release the hand-lever $d^9$ before the revolution is completed, in order that the shoe $d^6$ may be restored to a position to withdraw the pin $d$ from the recess $d'$. If the operator is attentive and skillful, this can readily be done; but it might sometimes happen that the operator would maintain the lever in a depressed position until the completion of the revolution of the shaft, and in such case the incline $d^{10}$ would not be in position to engage with the end of the pin $d$ to withdraw it from the recess $d'$, and, as a result, the pulley would remain clutched to the shaft and the latter would continue in motion and make a second revolution. For the purpose of preventing this and of providing means by which the pin $d$ will be withdrawn from the recess at the end of each revolution of the shaft regardless of the position of the hand-lever the shaft is provided with a tripping mechanism consisting of a cam-disk, $d^{11}$, which acts upon a lever, $d^{12}$, which is fulcrumed upon a stationary part of the machine, and is provided with a bolt, $d^{13}$, which engages with the lever $d^9$ near the rod $d^7$.

The cam-disk $d^{11}$ is so shaped that directly after the pulley D has been clutched to the shaft C, so as to set the latter in motion, it will operate to rock the lever $d^{12}$ and cause the stud $d^{13}$ to move the lever $d^9$ laterally, so as to disengage it from the shoulder $d^8$, and thus automatically release the rod $d^7$ and allow the shoe $d^6$ to be restored to its position upon the disk $d^2$. The hand-lever is sufficiently flexible so that it will spring past the end of the rod $d^7$ and be restored to its position beneath the shoulder $d^8$ upon being rocked by the operator.

In ordinary work there are two of the rubbing-stretchers (an inner and an outer stretcher) employed, as has been described. In some cases, however, particularly where the upper has been treed so as to be of the proper shape or nearly the proper shape to conform to the last by comparatively little stretching, the inner stretcher may be omitted. In other respects the machine and the operation will be the same as described.

Where the upper is provided with a lining or is composed of two plies of material, as when it is provided with a cap, and particularly in those cases where one of the plies, as the lining or the cap, stretches less readily than the other, it is sometimes desirable to employ, in addition to the inner and outer stretcher, an intermediate stretcher, which is located between the inner and outer stretchers, and is interposed between the upper and the lining or the cap, as the case may be. An organization of this character is illustrated in Figs. 39 and 40, in which the upper $g$ is provided with a lining, $g^2$, and in which there is provided an intermediate rubbing-stretcher, P, which is located between the outer and inner stretchers, M N, and is interposed between the upper and the lining. The intermediate stretcher is of substantially the same shape as the outer stretcher, but smaller. It consists of the stretcher proper, $p$, which may be either a strip of leather or other similar flexible material, the same as the strip $m$ of the outer stretcher, or may be composed of a series of narrow strips of elastic sheet metal, the same as or similar to the strips $n$ of the inner stretcher. The stretcher proper, $p$, is suspended from a head-plate, $p'$, which is of substantially the same shape as the head-plate $m'$, but somewhat smaller, and is interposed between the head-plates $m'$ $n'$, as shown.

When desired or found necessary, the intermediate stretcher may be introduced between the upper and a cap upon the outside of the upper instead of between the upper and the lining.

The operation when the three stretchers are employed is in all other respects the same as has already been described.

The mechanisms and the organization which have been described embody the invention in what I regard as its best form; but many of the features of construction may be somewhat varied without wholly departing from the invention. The apparatus for stretching and conforming the upper around the last may be varied to some extent in form and arrangement without departing from the substance of the invention as herein described, and this mechanism may be employed in connection with other forms of mechanism for folding over the edge of the upper onto the bottom of the last. So, also, the mechanism for folding over the edge of the upper may be employed with other forms of mechanism for effecting the stretching.

The several mechanisms will preferably be operated by power and in conjunction, as herein described; but they may be operated independently either by hand or power without departing wholly from the invention. Certain features of the individual instrumentalities which go to make up the machine may also be in themselves considerably modified without departing wholly from the invention. This is particularly the case with the downhold mechanism, which, although preferably of the form shown, may be somewhat varied so long as it provides an instrumentality for holding the last against the strain exerted by the rubbing stretcher or stretchers. The underneath support for the last may also be widely varied in form, although it will preferably be of substantially the form shown. The shield H may also be of any suitable construction to protect the upper from abrasion by the lateral pressers and to distribute the pressure of those pressers properly along the sides of the last, or the shield may be entirely omitted without departing from the invention. The form and arrangement of the lateral pressers, which in the case shown consist of the presser-fingers O, may also be considerably varied so long as suitable pressing instrumentalities are provided for exerting a sufficient pressure against the stretchers to give them the necessary frictional rubbing contact with the upper.

The method herein described of stretching the upper by means of rubbing-stretchers is not herein claimed, as such method forms the subject-matter of a separate application for Letters Patent filed by me December 31, 1888, Serial No. 294,301.

What I claim is—

1. The combination, with a last, of a rubbing-stretcher, substantially as described, for acting upon the outside of the upper, and lateral pressers, consisting of a plurality of independent fingers which are stationary relatively to the movement of the stretcher, for pressing said stretcher and the upper against the toe and sides of the last, substantially as described.

2. The combination, with a last, of a rubbing-stretcher, substantially as described, for acting upon the outside of the upper, lateral pressers, which are stationary relatively to the movement of the stretcher, for pressing said stretcher and the upper into contact, and a shield interposed between said pressers and stretcher, substantially as described.

3. The combination, with a last, of rubbing-stretchers, substantially as described, for acting, respectively, upon the inside and outside of the upper, and lateral pressers for pressing said stretchers and the upper into contact, substantially as described.

4. The combination, with a last, of rubbing-stretchers, substantially as described, for acting, respectively, upon the inside and outside of the upper, lateral pressers for pressing said stretchers and the upper into contact, and a shield interposed between said pressers and the outer stretcher, substantially as described.

5. The combination, with a last, of inner, outer, and intermediate rubbing-stretchers arranged to receive the upper and its lining or cap between them, respectively, and lateral pressers for pressing said stretchers and the upper, including its lining or cap, into contact, substantially as described.

6. The combination of a last and a rubbing-stretcher, substantially as described, for acting upon the outside of the upper, with lateral pressers, composed of adjustable fingers which are stationary relatively to the movement of the stretcher, for pressing the stretcher and the upper against the last, substantially as described.

7. The combination, with a last and a rubbing-stretcher, substantially as described, for acting upon the outside of the upper, of lateral pressers composed of adjustable fingers for pressing the stretcher and the upper against the last, and a shield interposed between said fingers and stretcher, substantially as described.

8. The combination, with a last, of rubbing-stretchers, substantially as described, arranged to receive the upper between them, and lateral pressers composed of adjustable fingers for pressing the stretchers and the upper against the last, substantially as described.

9. The combination, with a last, of rubbing-stretchers, substantially as described, arranged to receive the upper between them, lateral pressers composed of adjustable fingers for pressing the stretchers and the upper against the last, and a shield interposed between said fingers and the outer stretcher, substantially as described.

10. The combination, in a lasting-machine, of the last and means for supporting the last, a rubbing-stretcher, substantially as described, for acting upon the outside of the upper, lateral pressers, consisting of a plurality of independent fingers which are stationary relatively to the movement of the stretcher, for pressing said stretcher and the upper against the toe and sides of the last, and side and heel and toe crimpers for folding over the edge of the upper, substantially as described.

11. In a lasting-machine, a rubbing-stretcher consisting of flexible material suspended from a head-plate, with its lower edge hanging free and extending around the toe and along the sides of the last where the upper is to be stretched, substantially as described.

12. In a lasting-machine, an inner rubbing-stretcher consisting of elastic strips $n$, suspended from a head-plate and adapted to be inserted between the last and the portions of the upper which are to be stretched, substantially as described.

13. In a lasting-machine, an inner rubbing-stretcher consisting of elastic strips $n$, suspended from a head-plate and adapted to be inserted between the last and the portions of the upper which are to be stretched, and having the legs $n^2$, for regulating the extent of such insertion, substantially as described.

14. The combination, in a lasting-machine, of an inner rubbing-stretcher and an outer rubbing-stretcher, arranged one within the other and adapted to extend around the portions of the last where the upper is to be stretched, the inner stretcher being adapted to be inserted between the last and the upper, and the outer stretcher to extend outside the upper, substantially as described.

15. The combination, in a lasting-machine, of inner and outer rubbing-stretchers, arranged one within the other and adapted to receive the upper between them and to extend around the portions of the last where the upper is to be stretched, the inner stretcher being composed of elastic material and the outer stretcher of leather or similar flexible material, and lateral pressers for pressing the stretchers and the upper into contact, substantially as described.

16. The combination, in a lasting-machine, of the inner and outer rubbing-stretchers suspended from head-plates $n'$ $m'$, which overlap one another, substantially as described.

17. In a lasting-machine, the combination, with lateral pressers arranged to press toward the last, of a wedge-shaped head, $o^8$, for operating the pressers, substantially as described.

18. The combination, in a lasting-machine, of a rubbing-stretcher, lateral pressers, and an expansible shield interposed between said stretcher and pressers, substantially as described.

19. The combination, in a lasting-machine, of rubbing-stretchers, lateral pressers, and an expansible shield interposed between said pressers and the outer stretcher, substantially as described.

20. In a lasting-machine, the combination, with the independently-adjustable supports $o$, of the presser-fingers O, pivoted to said supports, and the springs $o^7$, for normally retracting said fingers, substantially as described.

21. In a lasting-machine, the combination, with the presser-fingers O, of the independently-adjustable supports $o$ for said fingers, and the locking-frame provided with the clamping plates and blocks $o^3$ $o^4$ for said supports, substantially as described.

22. In a lasting-machine, the combination, with inner and outer rubbing-stretchers, of means, substantially as described, for moving the outer stretcher in advance of the inner stretcher, substantially as described.

23. In a lasting-machine, the combination, with the inner and outer rubbing-stretchers, one supported upon the other, of means, substantially as described, for imparting a vertical movement to the outer stretcher and through that to the inner stretcher, with lost motion between the two, substantially as described.

24. In a lasting-machine, the combination, with the inner and outer rubbing-stretchers, one supported upon the other, of the standards $m^2$, cross-heads $m^5$, and cams $m^7$, for imparting a vertical movement to the stretchers, substantially as described.

25. In a lasting-machine, the combination, with the inner and outer rubbing-stretchers and means for imparting a vertical movement to them, of the standard $m^9$ and the catch for engaging with said standard to retain the stretchers in their raised position, substantially as described.

26. In a lasting-machine, the combination, with the last, of the loose removable jack, substantially as described, for supporting the last in the machine, substantially as described.

27. The combination, with the last, the loose removable jack for supporting the last from beneath, and a downhold for the last, of inner and outer rubbing-stretchers for stretching the upper around the last, and lateral pressers for pressing said stretchers and the upper against the last, substantially as described.

28. The combination, with the last and an underneath support for the last of a downhold for the last, inner and outer rubbing-stretchers for stretching the upper around the last, and lateral pressers for pressing said stretchers and the upper against the last, substantially as described.

29. In a lasting-machine, the combination, with the last and means for supporting it from beneath, of a telescopic downhold consisting of two members, one of said members being yielding with respect to the other, substantially as described.

30. In a lasting-machine, the combination, with the last, of a telescopic downhold composed of an inner and an outer member, and means, substantially as described, for moving one member away from the last in advance of the other, substantially as described.

31. In a lasting-machine, the combination, with the rubbing-stretchers having the standard $m^9$, of the catch $k^{37}$ and the vertically-moving guide-rod $k^9$, carried by the downhold mechanism, substantially as described.

32. In a lasting-machine, the combination, with the telescopic downhold composed of inner and outer members, each having a vertical movement independent of the other, of means, substantially as described, for depressing said members simultaneously, substantially as described.

33. In a lasting-machine, the combination, with the telescopic downhold composed of inner and outer members, each having a vertical movement independent of the other, of means, substantially as described, for depressing said members simultaneously and springs for raising said members independently, substantially as described.

34. In a lasting-machine, the combination, with the telescopic downhold composed of outer and inner members and springs for raising said members independently of each other, of the bar $k^2$, shaft $k^5$, and cams $k^6$, for depressing said members simultaneously, substantially as described.

35. In a lasting-machine, the combination, with the telescopic downhold composed of inner and outer members, of springs for raising said members independently of each other and an automatic tripper for releasing said outer member, substantially as described.

36. In a lasting-machine, the combination, with the last and an underneath support for the last, of a telescopic downhold for the last, composed of an outer member which conforms approximately to the shape of the insole and bears upon its margin, and an inner member which bears upon the insole inside the outer member, and means for raising the outer member in advance of the inner member, substantially as described.

37. The combination, with means for supporting the last and for stretching the upper around the last, of side-crimpers carried upon oscillating arms $s^{10}$, and eccentrics $s^{14}$, for rocking said arms to move the crimpers to and from each other, substantially as described.

38. In a lasting-machine, the combination, with the last and means for stretching the upper around the last, of side-crimpers carried upon oscillating arms $s^{10}$, and the eccentrics $s^{15}$, forming the fulcra for said arms, substantially as described.

39. The combination, with the last and means for stretching the upper around the last, of side-crimpers carried upon oscillating arms $s^{10}$, the eccentrics $s^{15}$, forming the fulcra for said arms, and the driven eccentrics $s^{20}$, connected to said fulcra, to impart a rising-and-falling movement to said crimpers, substantially as described.

40. The combination, with the last and means for stretching the upper around the last, of side-crimpers carried upon oscillating arms $s^{10}$, the eccentrics $s^{15}$, forming the fulcra for said arms, the driven eccentrics $s^{20}$, connected to said fulcra, to impart a rising-and-falling movement to the crimpers, and the eccentrics $s^{14}$, for imparting an oscillating movement to the arms carrying the crimpers, substantially as described.

41. In a lasting-machine, the herein-described side-crimper, consisting of a head, $s^5$, the loose removable head-blocks $s^3$, fitting into a chamber in said head, the loose removable blocks $s^8$, and clamping-screw $s^7$, for locking said blocks $s^3$ in any position to which they are adjusted, and the crimping-fingers $s$, having shanks which enter openings in said head-blocks and are adjustable therein, substantially as described.

42. The combination, with the last and means for stretching the upper around the last, of heel and toe crimpers, each composed of a number of radially-arranged independently-moving crimping-fingers, and independent means, substantially as described, for imparting a rising-and-falling movement to said fingers independently of their movement toward and from the last, substantially as described.

43. In a lasting-machine, the combination, with the independently-moving radially-arranged crimping-fingers $t$, of the adjustable spheroidal head-blocks $t^2$, carrying said fingers and resting in concave bearings, whereby said fingers can be adjusted to different inclinations both vertically and laterally, substantially as described.

44. In a lasting-machine, the combination, with the radially-arranged crimping-fingers $t$, of the threaded rods $t^9 t^{12}$, connected to said fingers, and the engaging gears $t^{10} t^{13}$, for imparting simultaneous and independent movement to said fingers, substantially as described.

45. In a lasting-machine, the combination, with the radially-arranged crimping-fingers $t$, of the threaded rods $t^9 t^{12}$, connected to said fingers, the engaging gears $t^{10} t^{13}$, for imparting simultaneous and independent movement to said fingers, and the rack and pinion for imparting movement to one of said threaded rods, substantially as described.

46. In a lasting-machine, the combination, with the radially-arranged crimping-fingers $t$, of the threaded rods $t^9 t^{12}$, connected to said fingers, the engaging gears $t^{10} t^{13}$, for imparting simultaneous and independent movement to said fingers, the rack and pinion for imparting movement to one of said threaded rods, and the universal joint $t^{14}$, through which said movement is imparted, substantially as described.

47. In a lasting-machine, the combination, with the independently-moving radially-arranged crimping-fingers $t$, of the driven eccentric $t^{35}$ and connections, substantially such as described, for imparting a rising-and-falling movement to said fingers, substantially as described.

48. In a lasting-machine, a heel or toe crimper consisting of a number of independently-moving screw-actuated radially-arranged crimping-fingers, $t$, which converge and overlap as they move toward and diverge as they move away from the last, substantially as described.

49. In a lasting-machine, the combination, with a stretching mechanism for stretching the upper around the last and crimpers for folding over its edge, of a driving-shaft and connections for operating said stretching mechanism and crimpers in proper sequence, a clutch for starting and stopping said shaft, a lever for operating the clutch, an automatic tripping mechanism, substantially as described, for tripping said clutch to stop the shaft after the stretching and after the folding operations, respectively, and an automatic tripping mechanism, substantially as described, for tripping the lever to disconnect it from the clutch after the clutching has been effected, substantially as described.

50. The combination, in a lasting-machine, of means for supporting the last, inner and outer rubbing-stretchers and co-operating lateral pressers for stretching the upper around the last, substantially as described, and side and heel and toe crimpers for folding over the edge of the upper, substantially as described.

51. The combination, in a lasting-machine, of an underneath support for the last, a telescopic downhold composed of inner and outer members, each having a vertical movement independent of the other, rubbing-stretchers and co-operating lateral pressers for stretching the upper around the last, substantially as described, and side and heel and toe crimpers, substantially as described.

52. The combination, in a lasting-machine, of the removable jack for supporting the last, the telescopic downhold consisting of two members each having a vertical movement independent of the other, rubbing-stretchers and co-operating lateral pressers for stretching the upper around the last, substantially as described, side-crimpers, and heel and toe crimpers composed of radially-arranged independently-moving crimping-fingers, substantially as described.

53. In a lasting-machine, the combination, with the last and means for stretching the upper around the last, of lateral pressers, substantially as described, arranged around the toe and along the sides of the last where the upper is to be stretched and adapted to be closed against the last to hold the upper in its stretched condition after the stretching, and mechanism for simultaneously closing said pressers against the last, substantially as described.

In testimony whereof I have hereunto set my hand in the presence of two subscribing witnesses.

JOHN PATTEN.

Witnesses:
T. H. PALMER,
G. M. BORST.